(12) United States Patent
Everding

(10) Patent No.: US 6,336,089 B1
(45) Date of Patent: Jan. 1, 2002

(54) INTERACTIVE DIGITAL PHONETIC CAPTIONING PROGRAM

(76) Inventor: Michael Everding, 807 Crestmore Pl., Venice, CA (US) 90291-4930

( * ) Notice: Subject to any disclaimer, the term of this patent is extended or adjusted under 35 U.S.C. 154(b) by 0 days.

(21) Appl. No.: 09/137,107

(22) Filed: Aug. 20, 1998

(30) Foreign Application Priority Data

Sep. 22, 1998 (JP) .......................................... 10-267920

(51) Int. Cl.7 .......................... G06F 17/20; G10L 17/00
(52) U.S. Cl. .......................... 704/1; 704/249; 434/169; 434/185
(58) Field of Search .......................... 704/1, 9, 8, 200, 704/258, 260, 270, 271, 272, 255; 434/156, 167, 169, 178, 185, 157, 323; 345/473, 474, 475

(56) References Cited

U.S. PATENT DOCUMENTS

| | | | | |
|---|---|---|---|---|
| 4,884,972 A | * | 12/1989 | Gasper | 434/185 |
| 5,010,495 A | * | 4/1991 | Willetts | 704/200 |
| 5,058,166 A | * | 10/1991 | Ney et al. | 704/254 |
| 5,393,236 A | * | 2/1995 | Blackmer et al. | 434/169 |
| 5,613,056 A | * | 3/1997 | Gasper et al. | 345/473 |
| 5,679,001 A | * | 10/1997 | Russell et al. | 434/185 |
| 5,717,828 A | * | 2/1998 | Rothenberg | 704/270 |
| 5,799,267 A | * | 8/1998 | Siegel | 704/1 |
| 5,810,599 A | * | 9/1998 | Bishop | 434/157 |
| 5,827,071 A | * | 10/1998 | Sorensen et al. | 434/323 |
| 5,857,173 A | * | 1/1999 | Beard et al. | 704/276 |
| 5,920,838 A | * | 7/1999 | Mostow et al. | 704/255 |
| 6,055,498 A | * | 4/2000 | Neumeyer et al. | 704/246 |

* cited by examiner

*Primary Examiner*—Joseph Thomas
(74) *Attorney, Agent, or Firm*—Irvine Keschner

(57) ABSTRACT

An interactive computer assisted pronunciation learning system which allows a student to compare his/her pronunciation with that of a model speaker. A model speaker's recorded reading of text is digitally linked to and aligned with each corresponding syllable of the text. Pitch, volume and duration parameters of each syllable are extracted digitally and displayed in a simplified notation above each word. The student's own speech is also recorded, analyzed, displayed, and/or replayed in the same manner. The student can choose the option of overlapping his/her own notation above those of the model speaker and determine whether, to what extent, and on which parameters his own speech varies from that of the model speaker. Scores may be provided in the margin denoting the percentage of correct correspondence to the model as well as the type and degree of each error.

8 Claims, 31 Drawing Sheets

(B)

ASSIGN EACH NOTE'S VERTICAL POSITION IN RELATION TO LINE ACCORDING TO PITCH VALUE: "-2" AT BOTTOM OF LINE HEIGHT, "-1" BETWEEN BOTTOM AND MIDLINE, "0" AT MIDLINE, "+1" BETWEEN TOP AND MIDLINE, AND "+2" AT TOP. DOT ABOVE LEFT OR RIGHT END OF NOTE DESIGNATES "+3", AN UNVOICED CONSONANT AT THAT END.

ASSIGN VOLUME VALUE (-2 TO +2) TO EACH NOTE IN PROPORTION TO NOTES'S ACTUAL VOLUME IN SPEECH STREAM. USER'S OWN AVERAGE NOTE VOLUME EQUAL TO "0"; VOLUME OF "-2", "-1", "+1", "+2" AND "3" VARY FROM USER'S AVERAGE AS MODEL SPEAKER'S VARIATIONS IN VOLUME RANGE.

ASSIGN EACH NOTE A NUMBER (1 TO 5) OF HORIZONTAL LINES ACCORDING TO VOLUME VALUE. LENGTH OF LINE SPECIFIED BY DURATION VALUE. LINES SEPARATED BY TWO LINE THICKNESSES. "-2" VOLUME = PITCH LINE, ONE LINE OF TRIPLE THICK- NESSES AT NOTE'S ASSIGNED PITCH POSITION; "-1" VOLUME VALUE = TWO LINES, THE FIRST IS PITCH LINE, THE SECOND IS OF NORMAL (SINGLE) THICKNESS AND IS ADDED BELOW THE PITCH LINE; "0" VOLUME VALUE = THREE LINES, THE FIRST IS PITCH LINE, THE REST ARE SINGLE THICKNESS PLACED BELOW PITCH LINE; "+1"= FOUR LINES, THE FIRST IS PITCH LINE, THE REST ARE OF NORMAL THICKNESS ADDED.

ASSIGN DURATION VALUE (-2 TO +3) TO EACH NOTE AT ASSIGNED LOCATION IN PORPORTION TO NOTE'S ACTUAL DURATION IN SPEECH STREAM. USER'S OWN AVERAGE SYLLABLE DURATION EQUAL TO "0"; DURATION OF "-2", "-1", "+1", AND "+2" VARY FROM USER'S AVERAGE AS MODEL SPEAKER'S VARIATIONS. "+3" IS ASSIGNED TO EXTREME DURATION VALUES.

↓

ASSIGN EACH NOTE'S HORIZONTAL LENGTH ACCORDING TO DURATION VALUE: "-2"=1/5 OF DISTANCE ASSIGNED TO SYLLABLE, "-1"= 2/5 DISTANCE ASSIGNED SYLLABLE, ETC.

↓

MAXIMUN HORIZONTAL LENGTH OF EACH NOTE IS ACTUAL DISTANCE (ON STANDARD ENGLISH LINE) BETWEEN END OF LAST LETTER OF PREVIOUS SYLLABLE AND BEGINNING OF FIRST LETTER OF FOLLOWING SYLLABLE (OR PUNCTUATION MARK OR END OF LINE), LEAVING ONE LINE WIDTH (THE WIDTH OF ONE SAN SERIF ASCENDER, E.G., THE LETTER "I") AS A MINIMUM DISTANCE BETWEEN NOTES OF DIFFERENT SYLLABLES.

↓

ACTUAL MAXIMUM HORIZONTAL LENGTH OF NOTES WITHIN ANY PAGE IS SET BY LENGTH OF MODEL-SPEAKER'S NOTE OF LONGEST DURATION FIRST, THEN BY SPAN OF RESPECTIVE SYLLABLE ON STANDARD ENGLISH LINE. WHERE SPAN OF SYLLABLE IS SHORTER THAN THE LENGTH REQUIRED TO FULLY REPRESENT DURATION, A SINGLE VERTICAL LINE OF SUFFICIENT LENGTH IS ADDED THROUGH THE CENTER OF NOTE UP TO HEIGHT OF SPACE AVAILABLE TO USER'S NOTE LINE. ADDITIONAL VERTICAL LINES ARE ADDED AS NECESARY TO EXPRESS LONGER DURATION UNTIL SPACE IS EXCEEDED.

"3" = MORE THAN 2 UNITS OF MEASURMENT MORE THAN MODEL
"2" = TWO UNITS OF MEASURMENT MORE THAN MODEL
"1" = ONE UNIT OF MEASURMENT MORE THAN MODEL
"0" = SAME PAUSE DURATION OR TREND OF ELEMENT
"-1" = ONE UNIT OF MEASURMENT LESS THAN MODEL
"-2" = TWO UNITS OF MEASURMENT LESS THAN MODEL
"-3" = MORE THAN TWO UNITS OF MEASURMENT LESS THAN MODEL

↓

SUM USER'S COMPARISON SCORES ON DIMENSIONS OF PITCH, VOLUME, AND DURATION TRENDS FROM EACH LINE, SENTENCE AND PARAGRAPH.

↓

CALCULATE PERCENTAGE OF CORRECT TRENDS FOR EACH DIMENSION, ELEMENT BY ELEMENT.

↓

DISPLAY USER'S COMPARISON SCORES IN SCORE WINDOW WITH RAW VARIATION SUM RATIOS AND PERCENTAGES FOR EACH DIMENSION, BY WORD, SENTENCE, LINE, AND PARAGRAPH. PITCH IS DISPLAYED UNDER "MELODY," WITH PREDOMINANT ERROR-TYPE: FAILURE TO RAISE OR LOWER PITCH; VOLUME, DURATION, AND SCORES FOR PAUSES ARE DISPLAYED INDIVIDUALLY UNDER "RHYTHM", WITH PREDOMINANT ERROR-TYPE: FAILURE TO RAISE OR LOWER VOICE, HOLD OR STOP DURATION, OR LINK OR SEPARATE SYLLABLES. PRIMARY LOCATION OR PREDOMINANT ERROR-TYPES FOR PITCH AND VOLUME ARE SPECIFIED AS OCCURRING AT EITHER ACCENTED OR UNACCENTED SYLLABLES. RUNNING PARAGRAPH SCORES ARE DISPLAYED AS THEY ACCUMULATE, ELEMENT BY ELEMENT.

↓

( EXIT )

FIG. 22D

INTERACTIVE DIGITAL PHONETIC CAPTIONING PROGRAM

BACKGROUND OF THE INVENTION

1. Field of the Invention

The present invention relates to a computerized, interactive pronunciation learning system wherein the pitch (frequency), volume (amplitude) and duration of a model speaker's reading of text is encoded digitally and compared with the encoded pitch, volume, and duration of a user's speech, provision being made for display of the results such that the user can visually and audibly ascertain the abstracted differences between the model's and user's speech parameters.

2. Description of the Prior Art

Computer assisted language learning systems have been disclosed in the prior art. For example, U.S. Pat. No. 5,010,495 to Willetts discloses, inter alia, a system wherein a student can select a model phrase from text displayed on an electronic display, record in digitized form his own pronunciation of that phrase and then listen to the digitized vocal version of the selected phrase and his own recorded pronunciation for comparison purposes. The background section of the '495 patent describes a number of other prior art computer assisted language learning systems. For the sake of brevity, the prior art description set forth in the '495 patent will not be repeated herein.

Although the prior art systems include various features necessary for providing visual text displays and associated digitized audio speech and the '495 patent discloses a system which allows a student to select a model phrase from text displayed on an electronic display, record his own pronunciation of that phrase and then listen to the digitized vocal version of the selected phrase and his own recorded pronunciation for comparison purposes, the comparison is accomplished without having a visual representation nor any objective comparison of the differences.

What is therefore desired is to provide a computer assisted language learning system wherein the prosodic differences of pitch, volume, and duration and other quantifiable differences are compared and/or relayed such that the differences therebetween can be graphically displayed, specified objectively and/or heard as audible tones.

SUMMARY OF THE PRESENT INVENTION

The present invention provides an interactive computer assisted pronunciation learning system which allows a student to compare his/her pronunciation with that of a model speaker. The model speaker's reading of a text selection is digitally linked to each corresponding syllable segment of text. Pitch, volume, and duration parameters of each syllable are extracted digitally and displayed in a simplified "musical"-type notation above each word. Those parameters are stored for optional replay of extracted tones. The student's own speech is also recorded and linked to and aligned with the model's. The student's speech record is analyzed, displayed and/or replayed in the same manner as the model. The student can choose the option of overlapping his/her own notation upon that of the model speaker and determine by inspection, where his/her own speech varies from that of the model speaker, to what degree, and on which parameter. When selected from the menu, scores are displayed in the margin denoting the percentage of correct correspondence to the model as well as the type and degree of each type of error.

The present invention thus improves upon existing interactive computer assisted learning systems by providing an easily used software program which links and aligns a student's speech record digitally to the speech record of a model for comparative processing and which enables a student to visually compare the characteristics of his/her speech, such as pitch, volume, and duration with that of a model speaker and to specify the percentage of correspondence between the student's pronunciation and that of the model speaker.

DESCRIPTION OF THE DRAWINGS

For a better understanding of the invention as well as other objects and further features thereof, reference is made to the following description which is to be read in conjunction with the accompanying drawing wherein.

DESCRIPTION OF THE INVENTION

Figure 1:
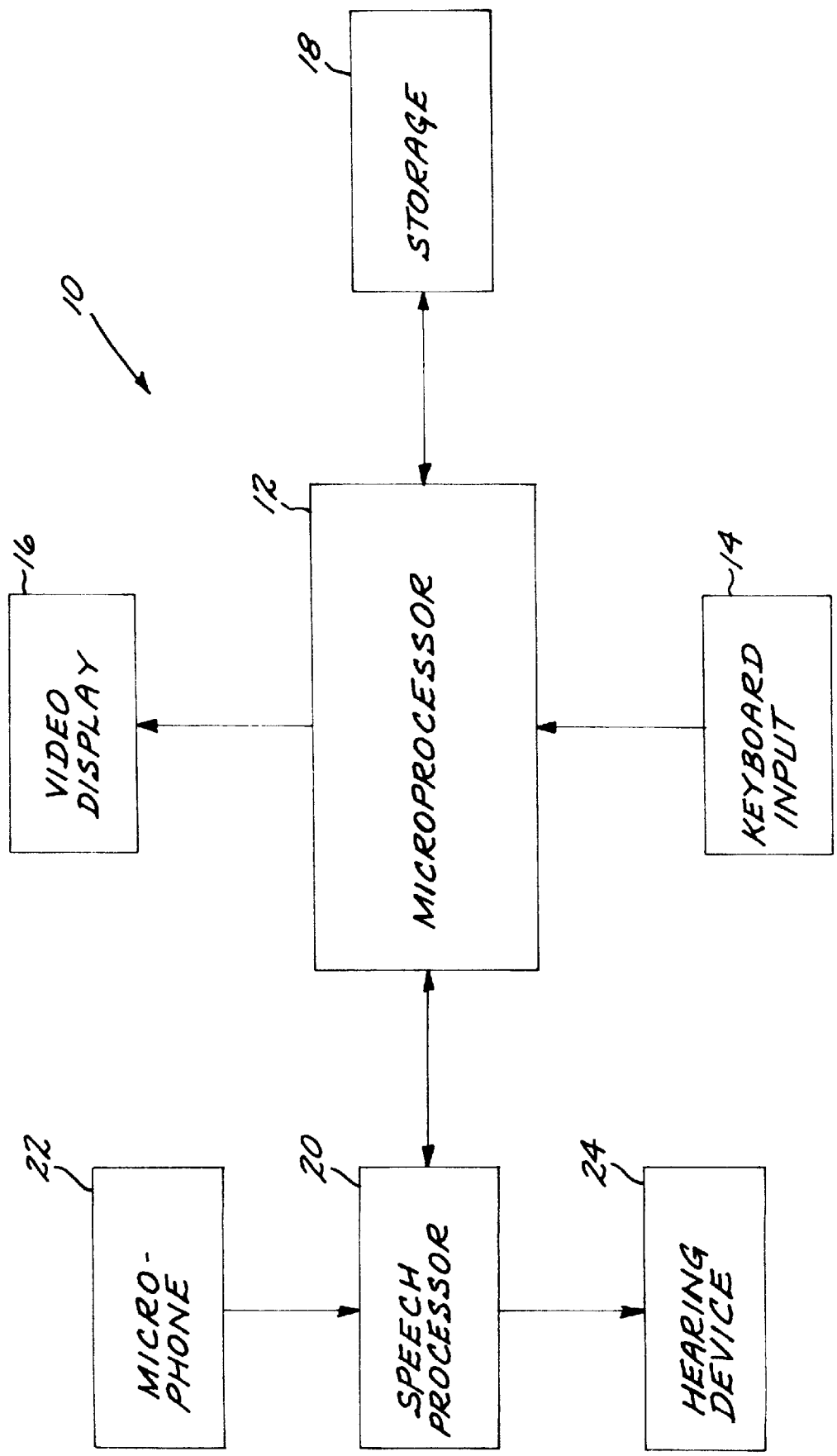
FIG. 1 is schematic block diagram of an interactive pronunciation learning system in accordance with the teachings of the present invention.

Referring now to FIG. 1, a simplified schematic block diagram of the system 10 of the present invention is illustrated. The system comprises microprocessor 12, such as the Pentuim Power PC manufactured by Intel Corporation, Santa Clara, Calif., keyboard input 14, video display 16, digital storage member 18, a speech processor 20, such as the Sound Blaster 16 Value Edition manufactured by Creative Labs, Inc., Mipitas, Calif., microphone 22 and hearing device 24. Components 14, 16, 18, 22 and 24 are conventional and thus will not be set forth in detail herein.

In operation, a model speaker's reading of any text via microphone 22 is digitally linked to each corresponding syllable of text by speech processor 20, microprocessor 12 and storage means 18. The pitch, volume and duration parameters of each syllable are extracted digitally, stored temporarily and displayed by member 16 in a simplified notation above each word and/or replayed as tones by the computer. The student's own speech is recorded via speech processor 20, microprocessor 12 and storage means 18 and are displayed by member 16 in a simplified notation, overlapping the notation of the model speaker to determine whether his own speech varies from that of the model speaker in one embodiment. In a second embodiment, scores are provided in the margin on display 16 in a manner to show the percentage of correct pronunciation when compared to the model as well as the type and degree of each error. In a third embodiment, the extracted elements of pitch, volume and duration may optionally be replayed as tones via microprocessor 12.

Figure 2:
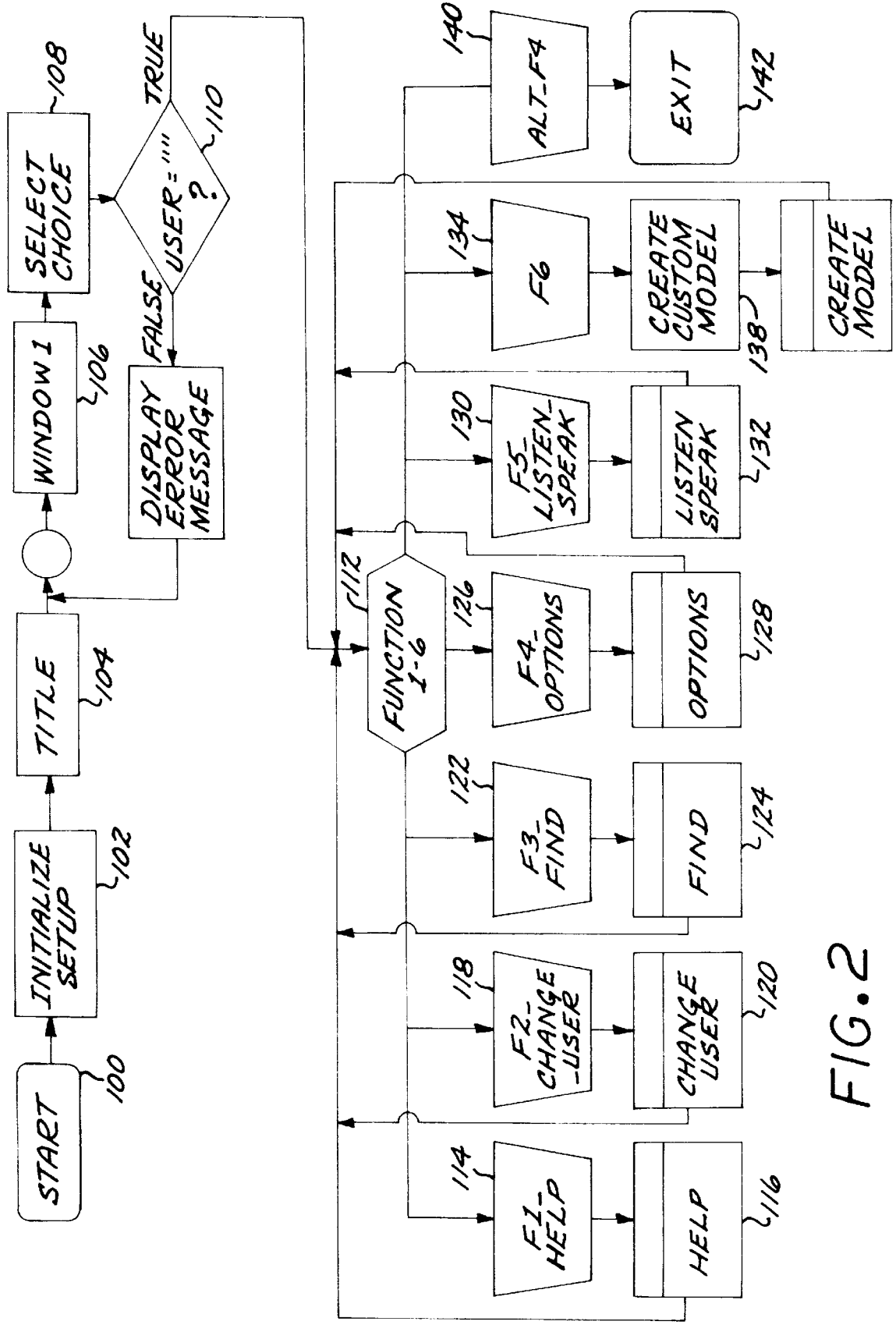
FIGS. 2–27 are schematic software flow charts or WINDOW displays illustrating the features of the present invention.

Referring now to FIG. 2, a flow chart for the software used in the system of the present invention is illustrated.

The system is started when the power is applied (step 100), the system is initialized (step 102), the title of the running software is displayed (step 104), the window video display (step 106, FIG. 3) has a select choice displayed thereon (step 108) and a comparison is made (box 110) to ascertain that the proper user is on line.

If the correct user is on line, the user selects one of six functions (step 112) in the form of function selections on the WINDOW display. The first function is HELP (step 114), which displays that term (step 116); the second function is CHANGE USER (step 118) which then gets the change user to log on (step 120); the third function is FIND (step 122) and the associated find function (step 124); the fourth function is OPTIONS (step 126) and the associated option function (step 128); the fifth function is LISTEN/SPEAK (step 130) and the associated listen/speak function (step 132); and the sixth function (step 134) initiates the custom model (step 136) which in turn creates the custom model (step 138). The last function, ALT F4 (step 140), carries to the main exit function (step 142) and the program end.

FIGS. 3–27 include the specific software subroutines utilized in the present invention. The figures also include certain WINDOW displays and specific routines for preparing the user notes and scores.

Figure 3:
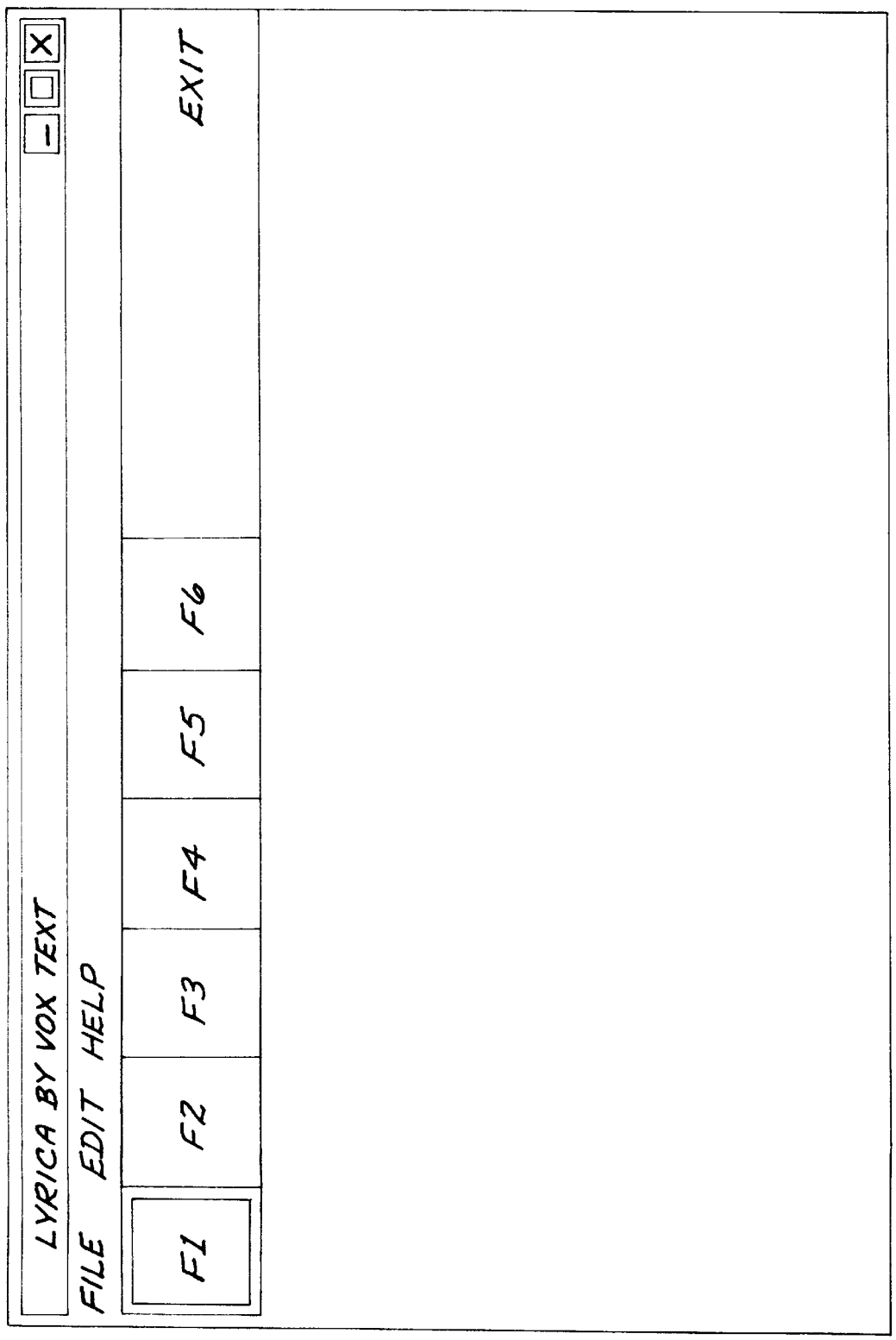
Figure 4:
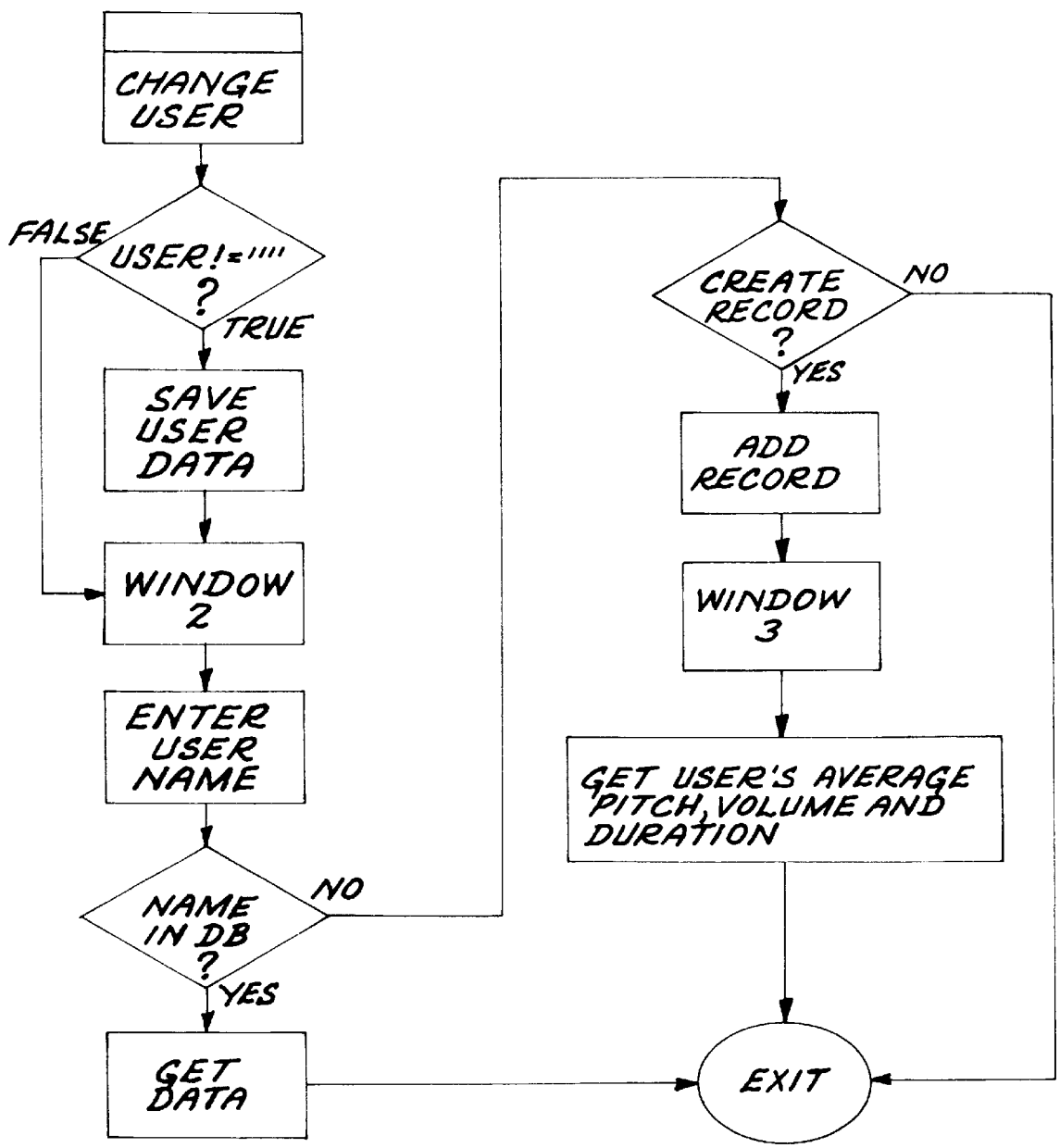
Figure 5:
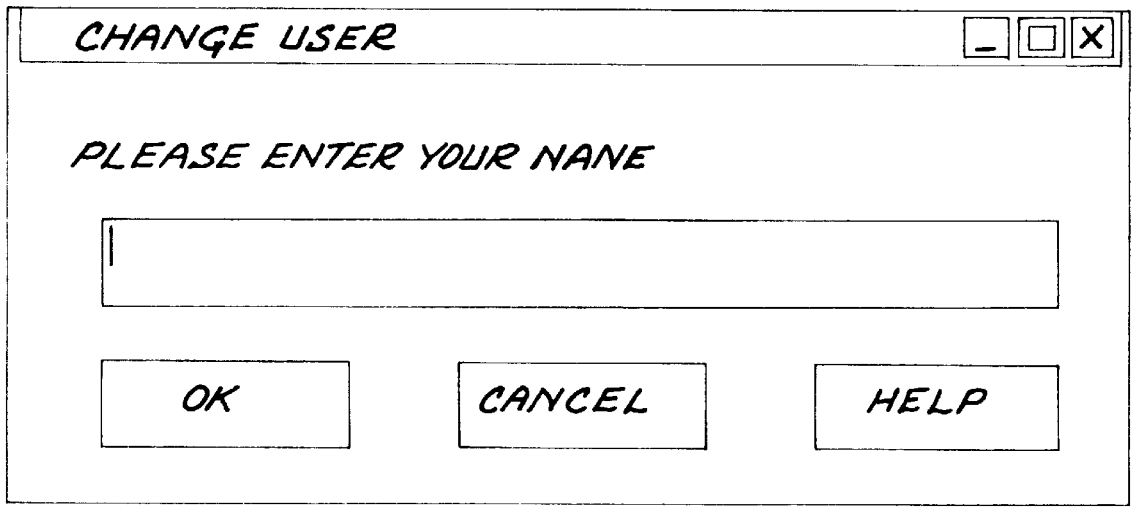
Figure 6:
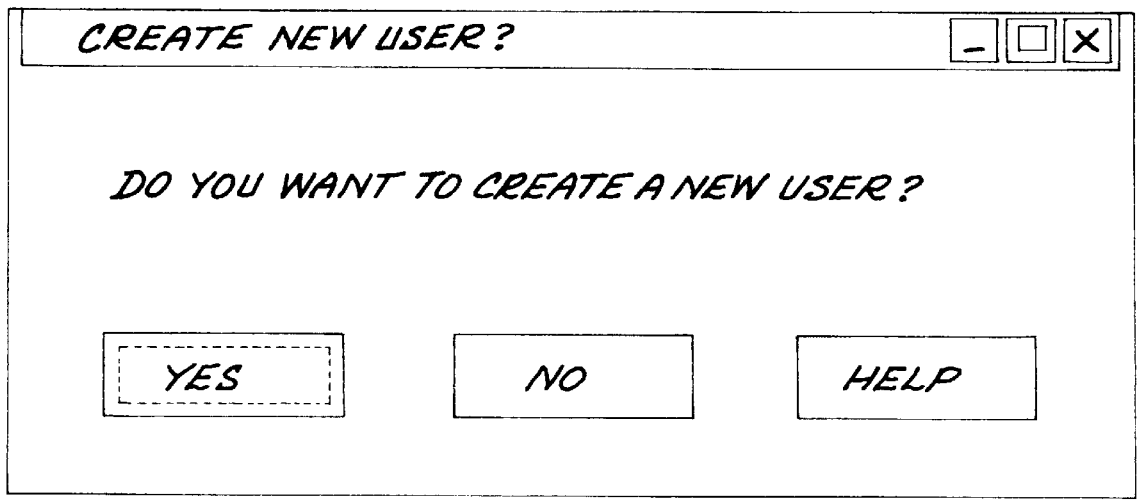
Figure 7:
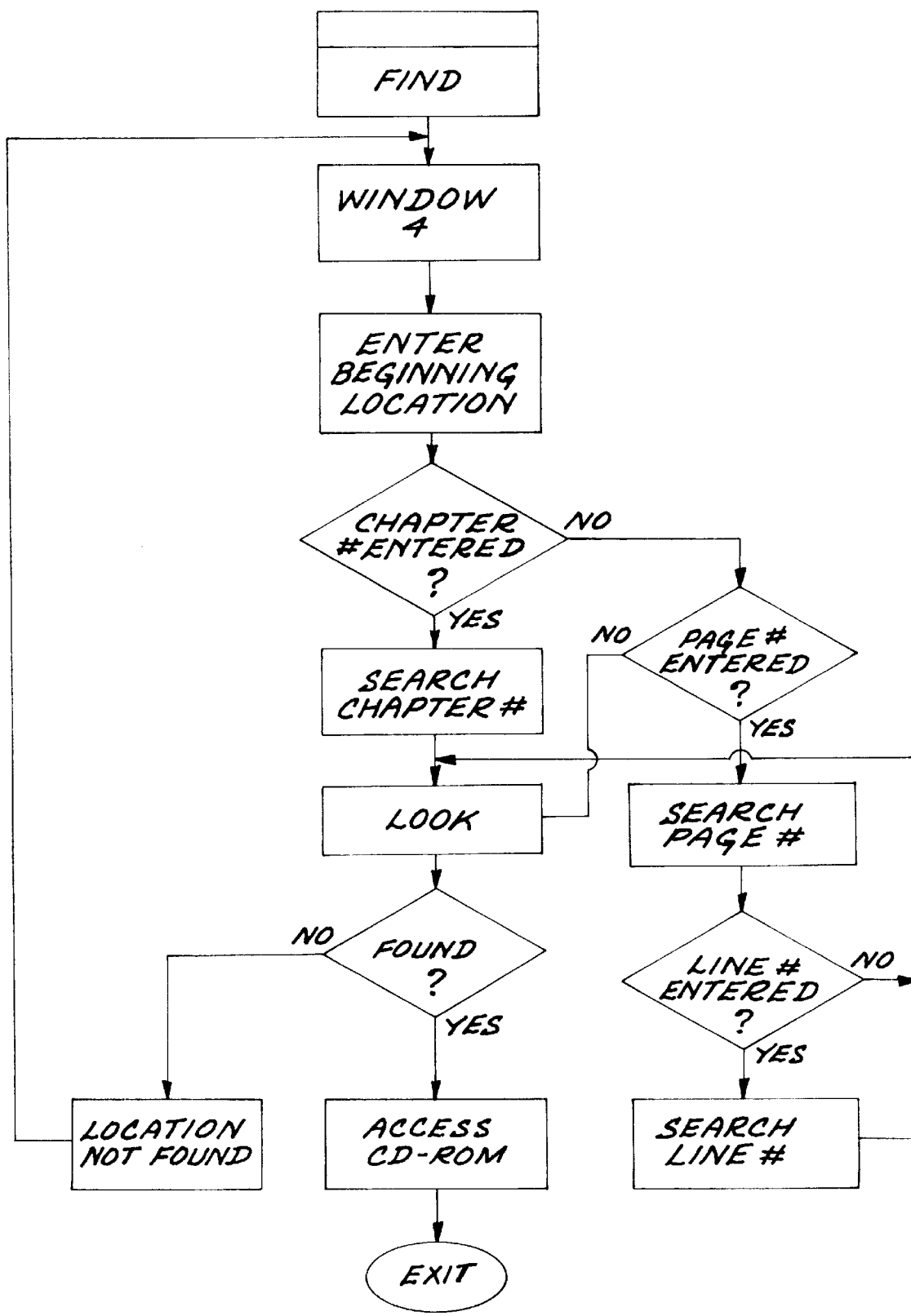
Figure 8:
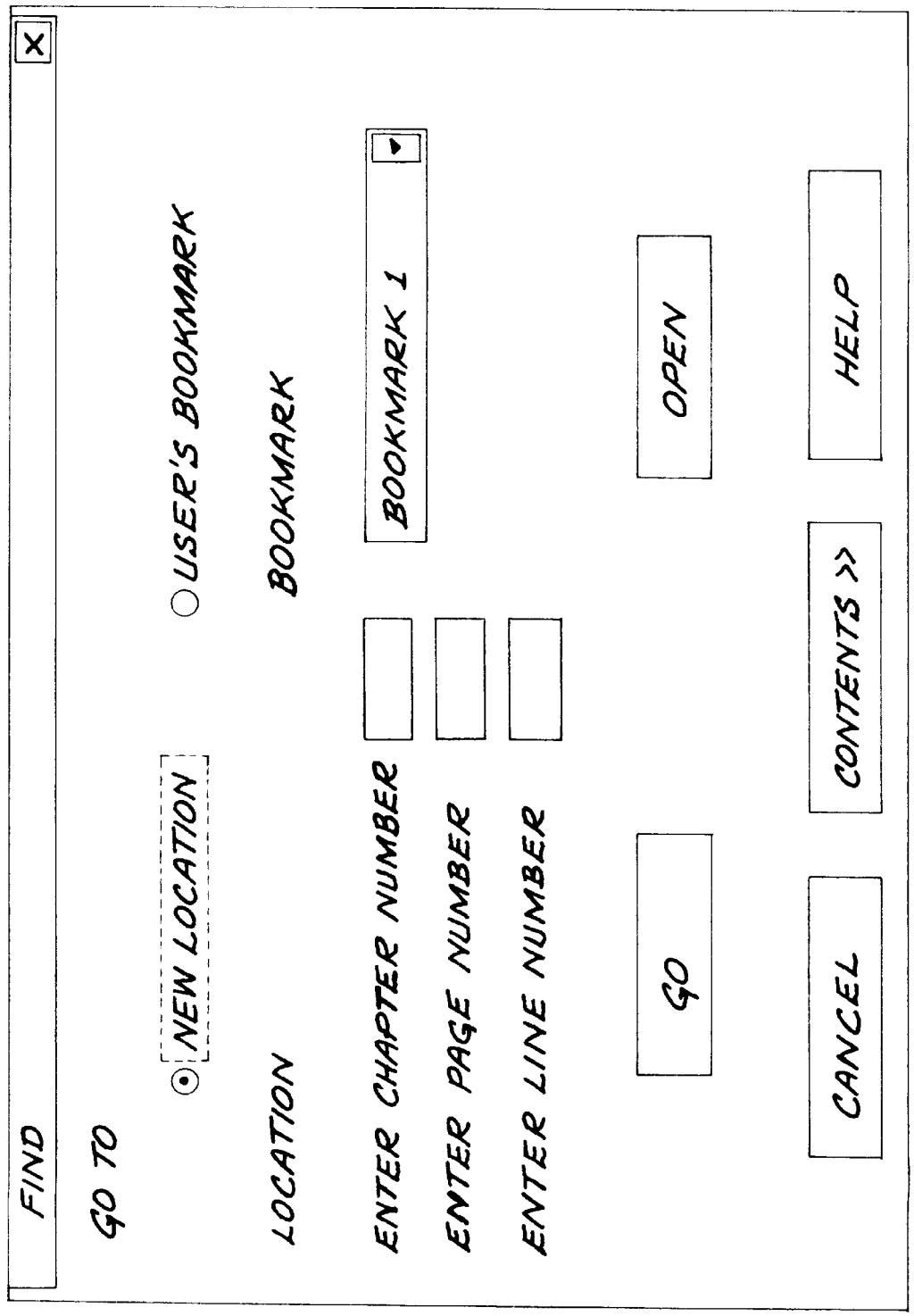
Figure 9:
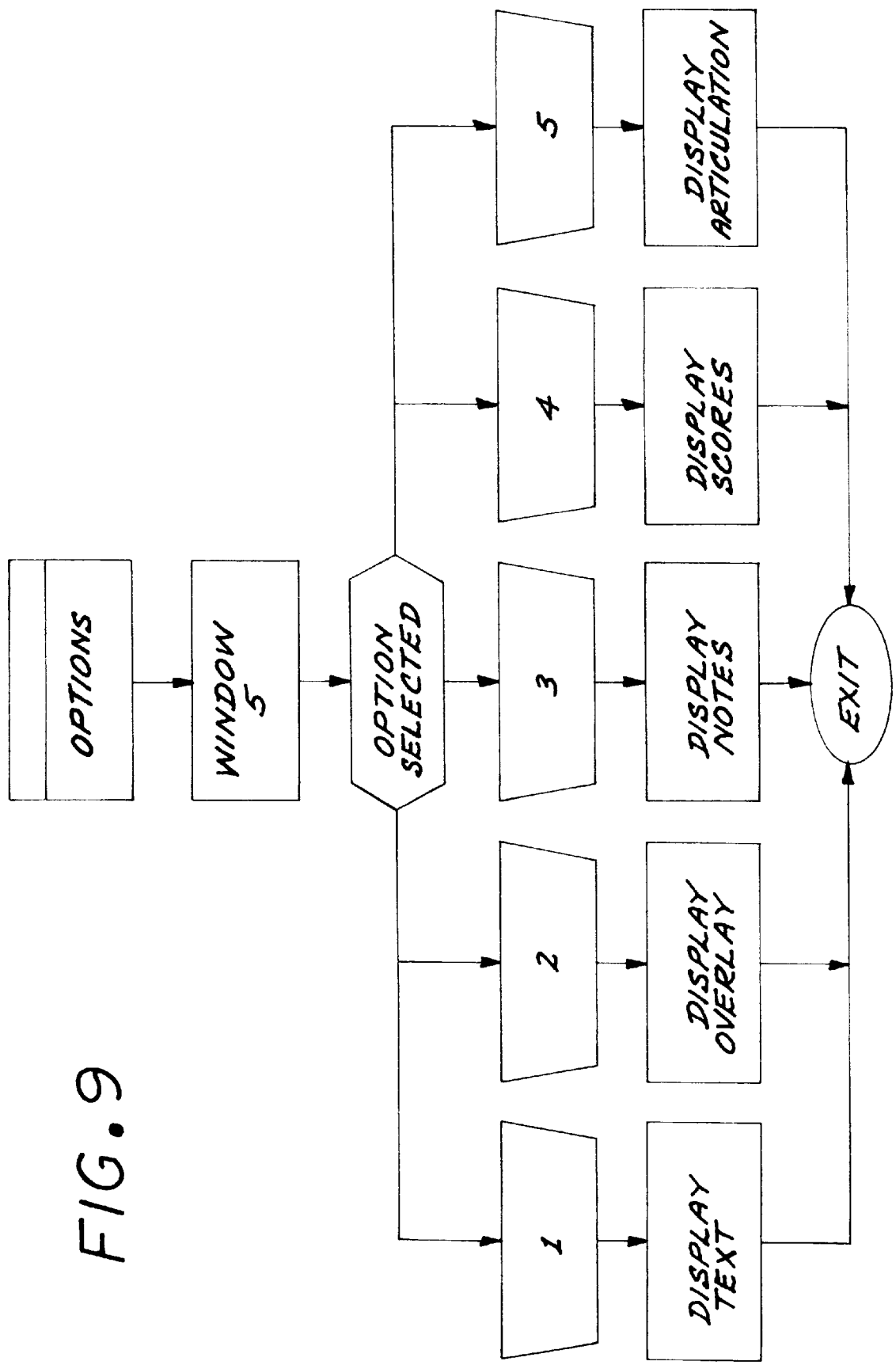
Figure 10:
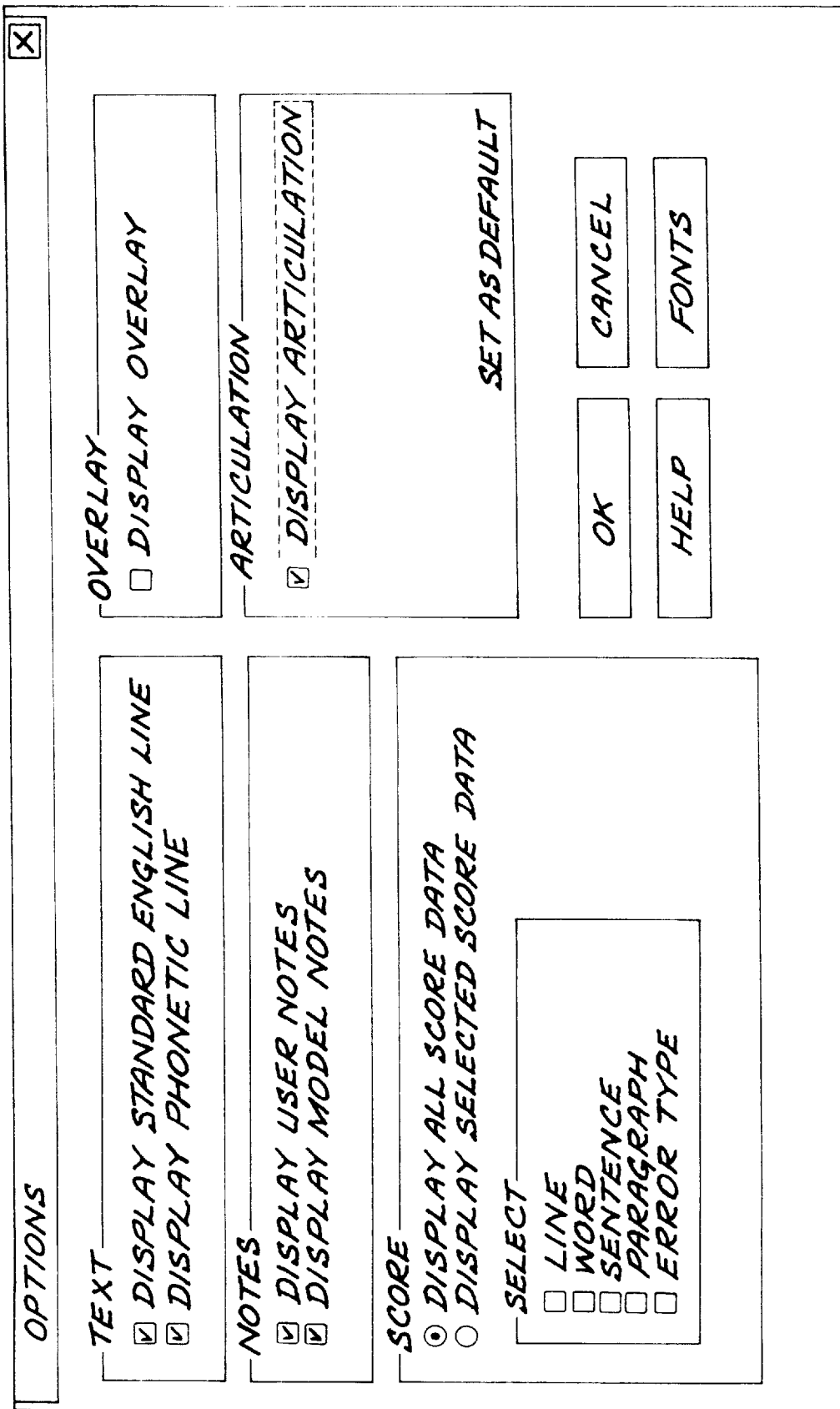
Figure 11:
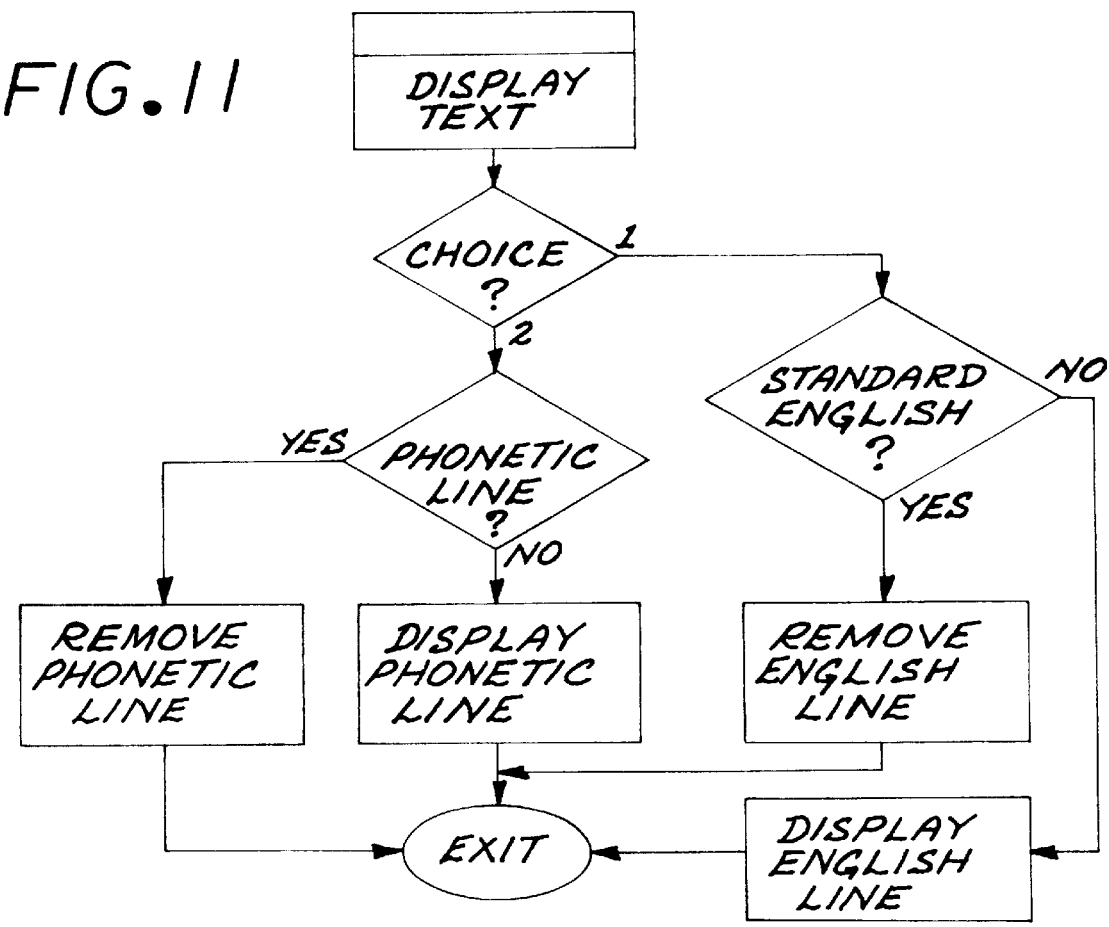
Figure 12:
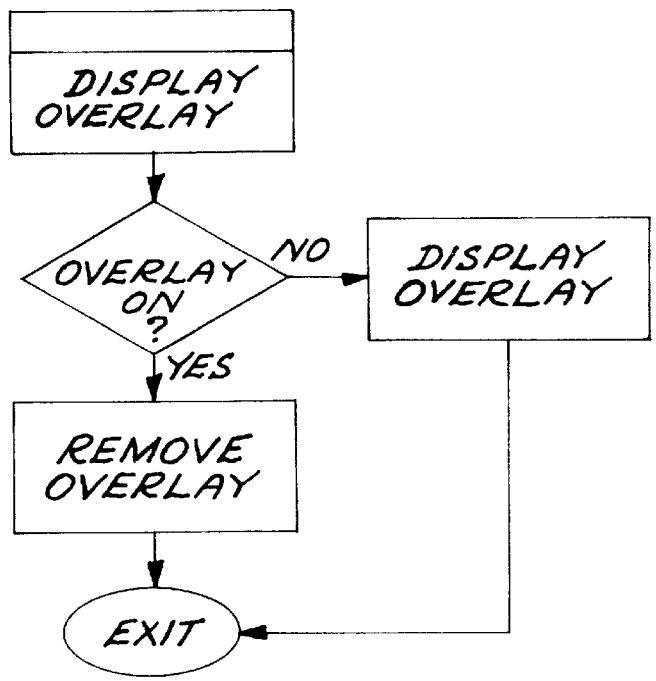
Figure 13:
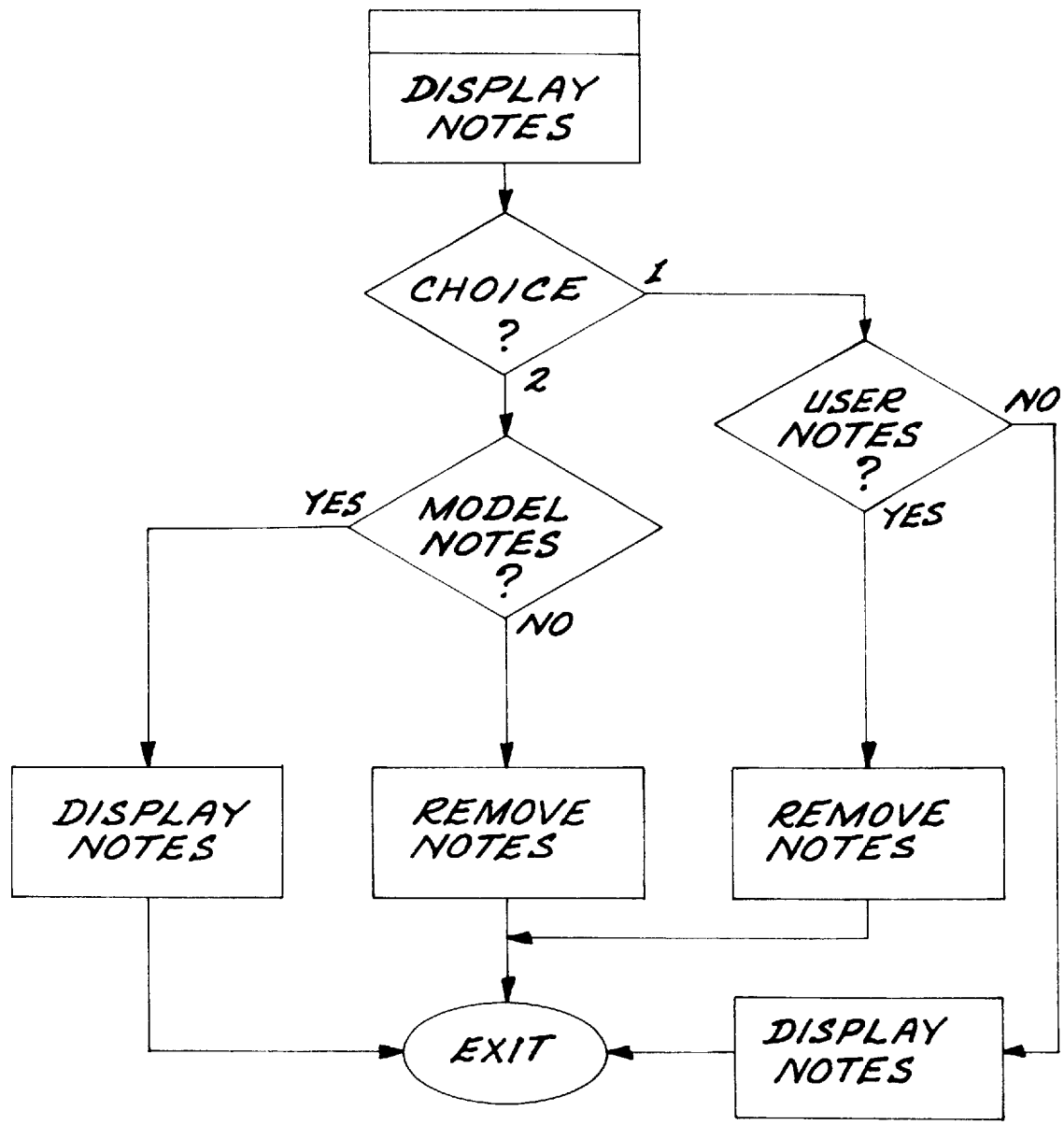
Figure 14:
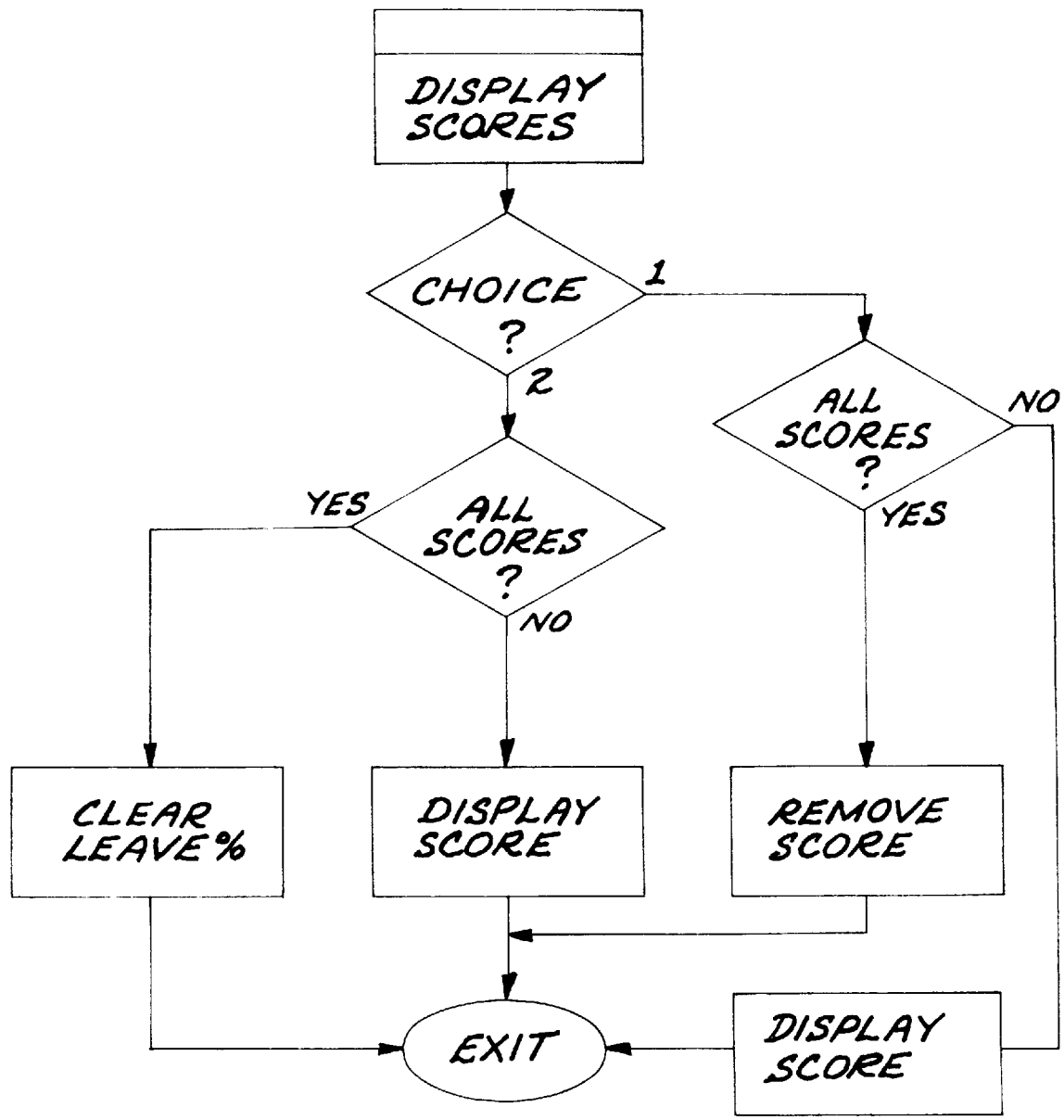
Figure 15:
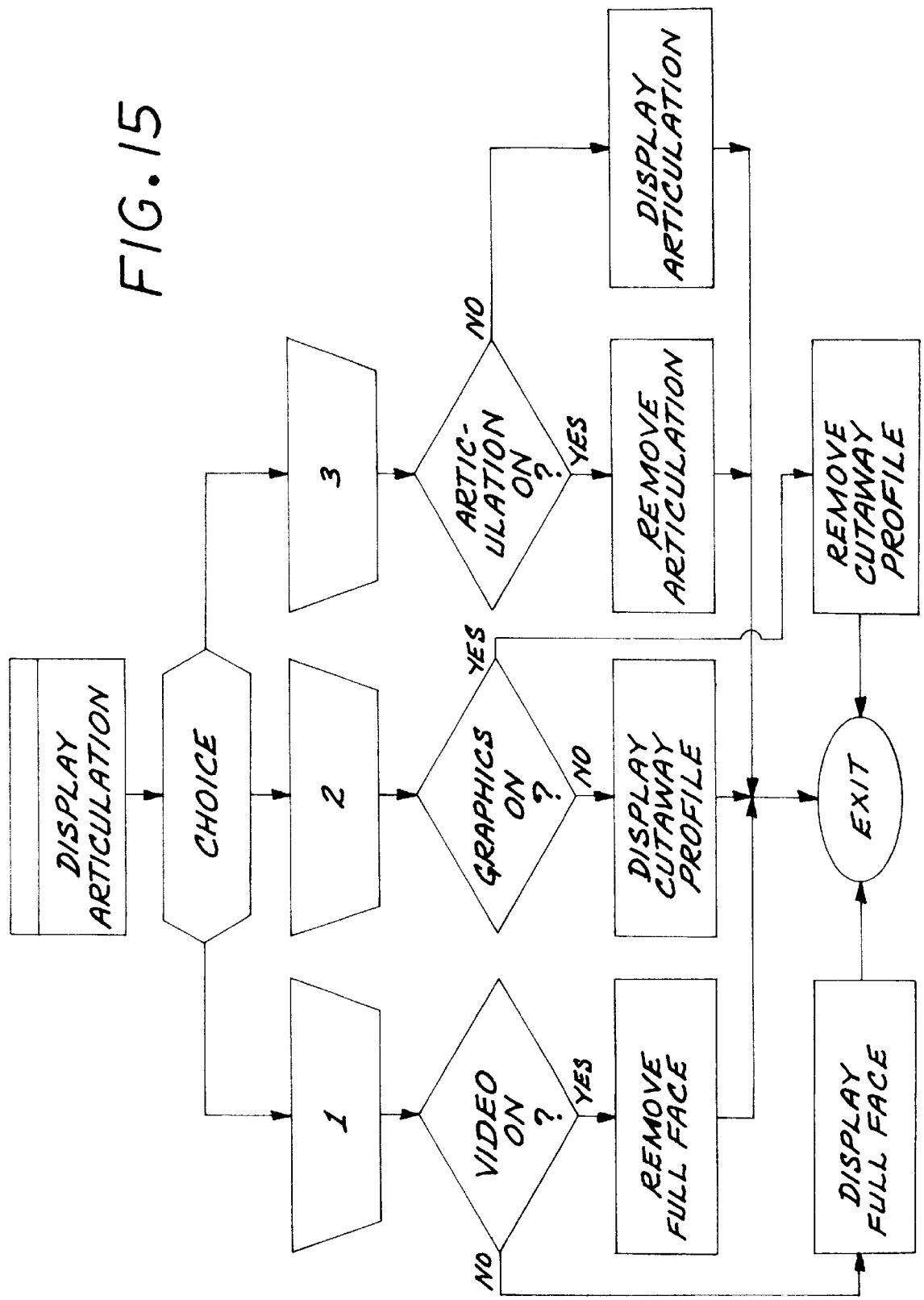
Figure 16A:
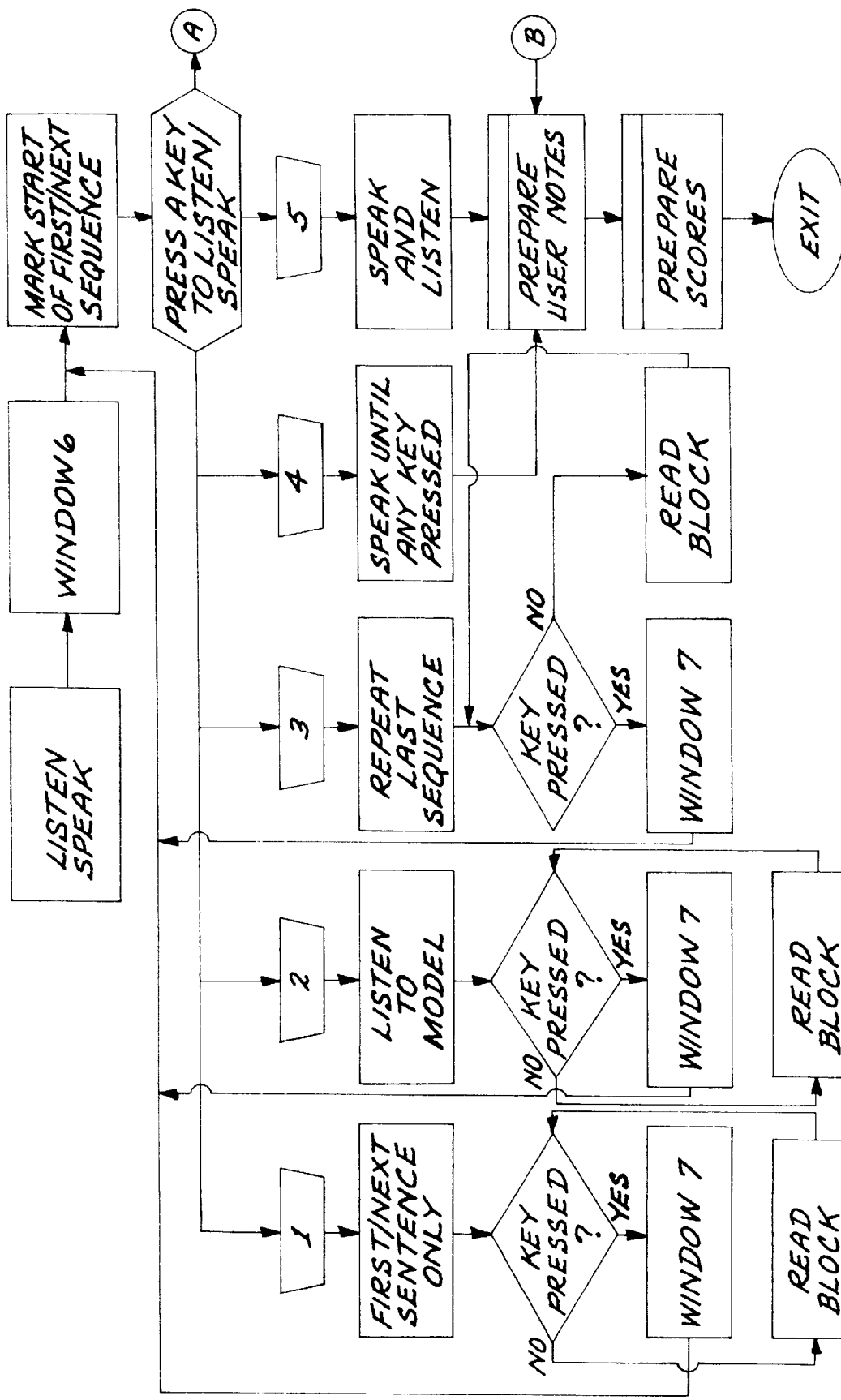
Figure 16B:
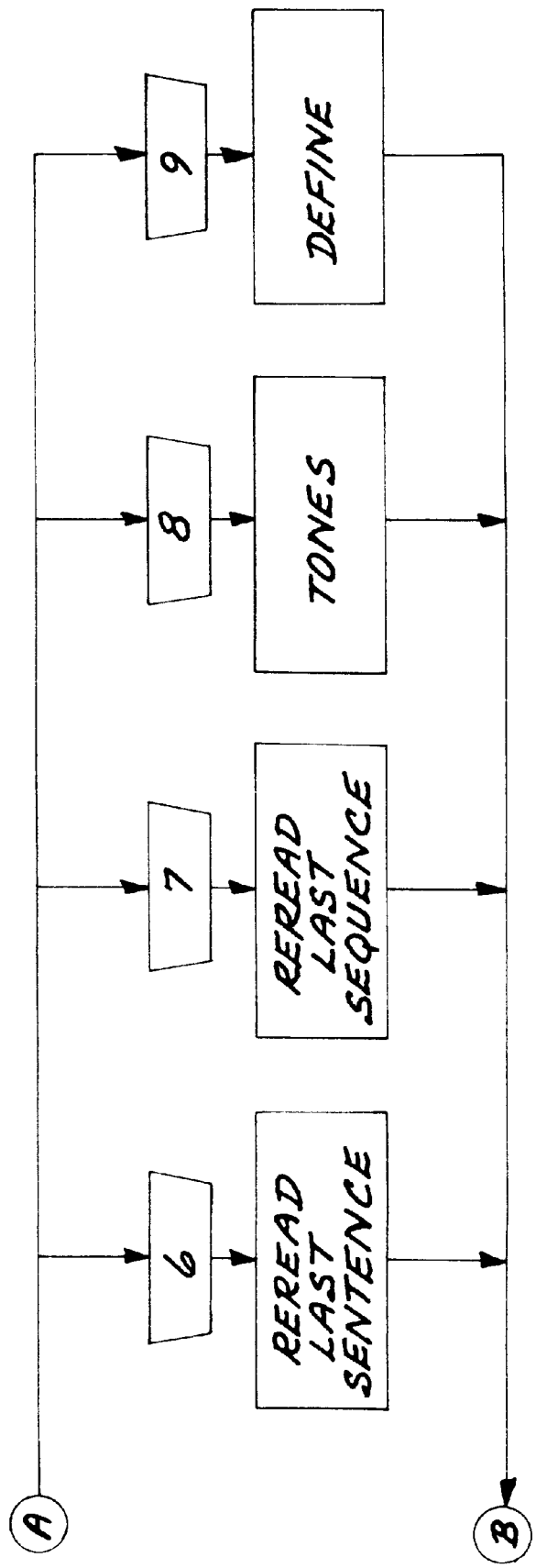
Figure 17:
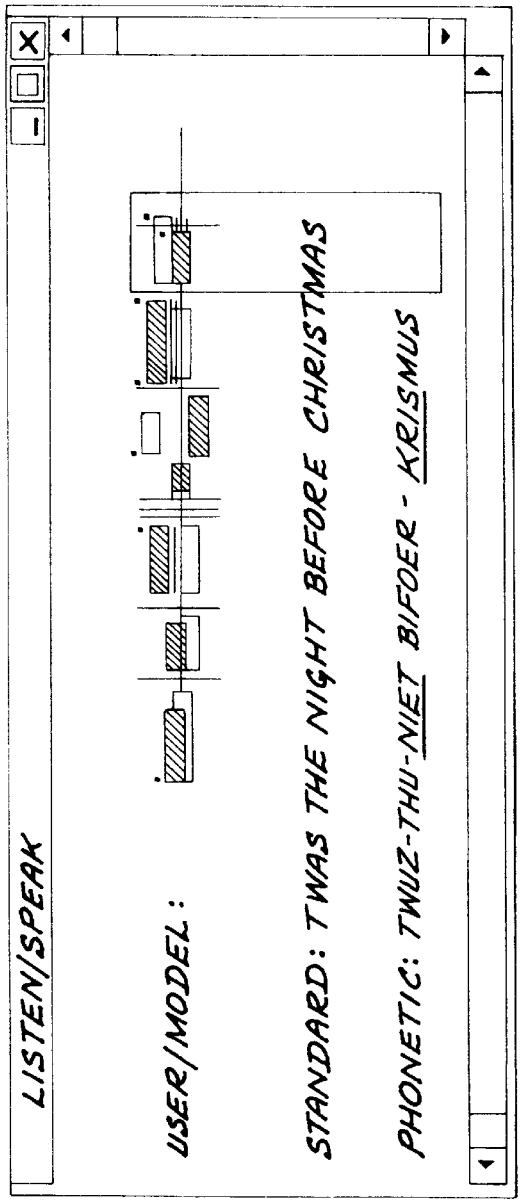
Figure 18:
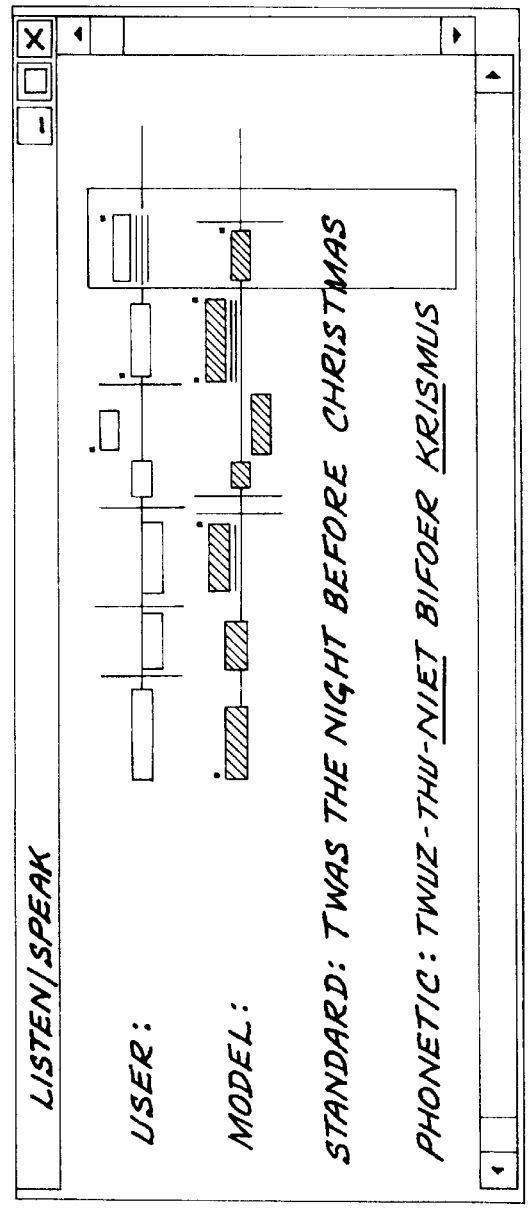
Figure 19:
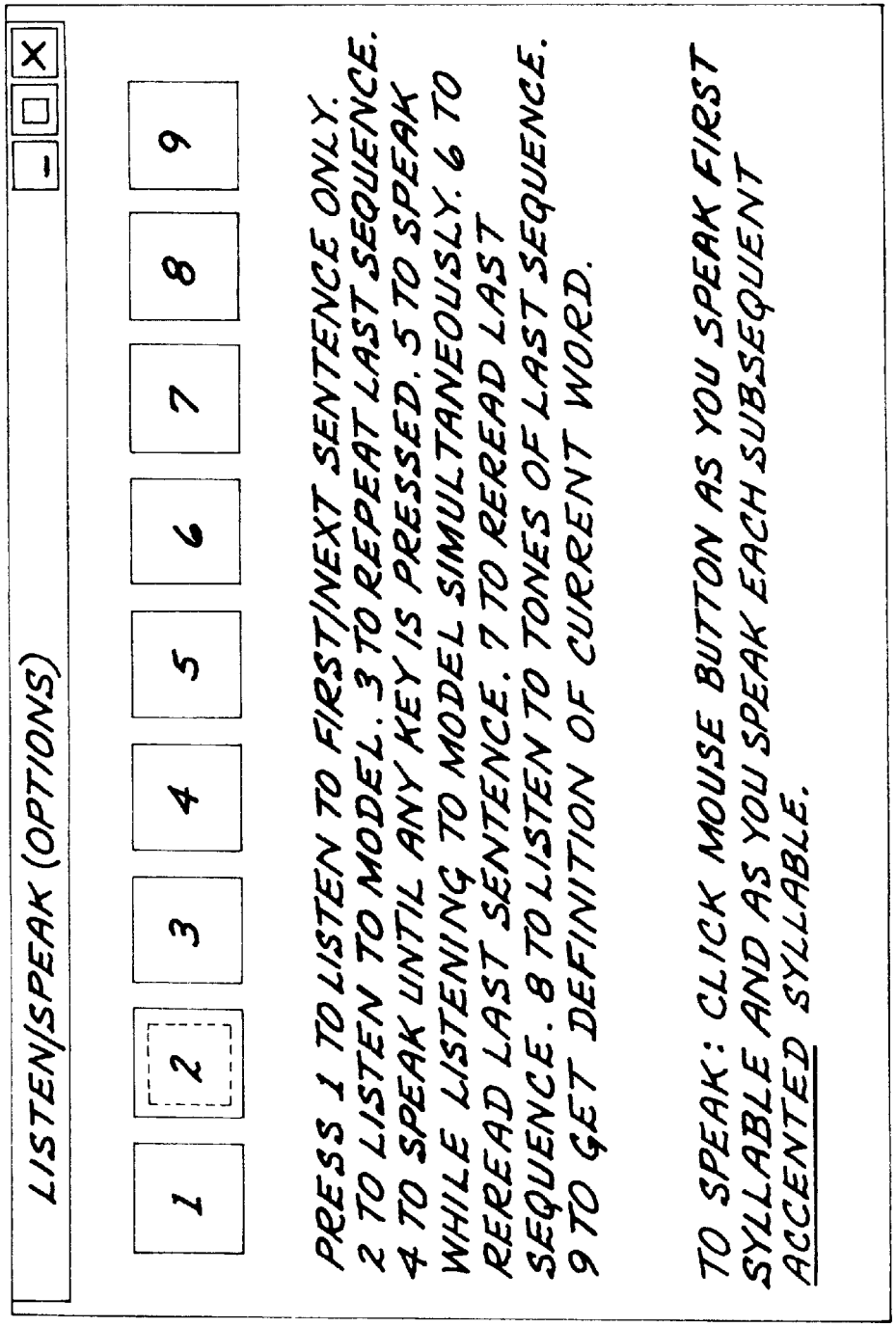
Figure 20:
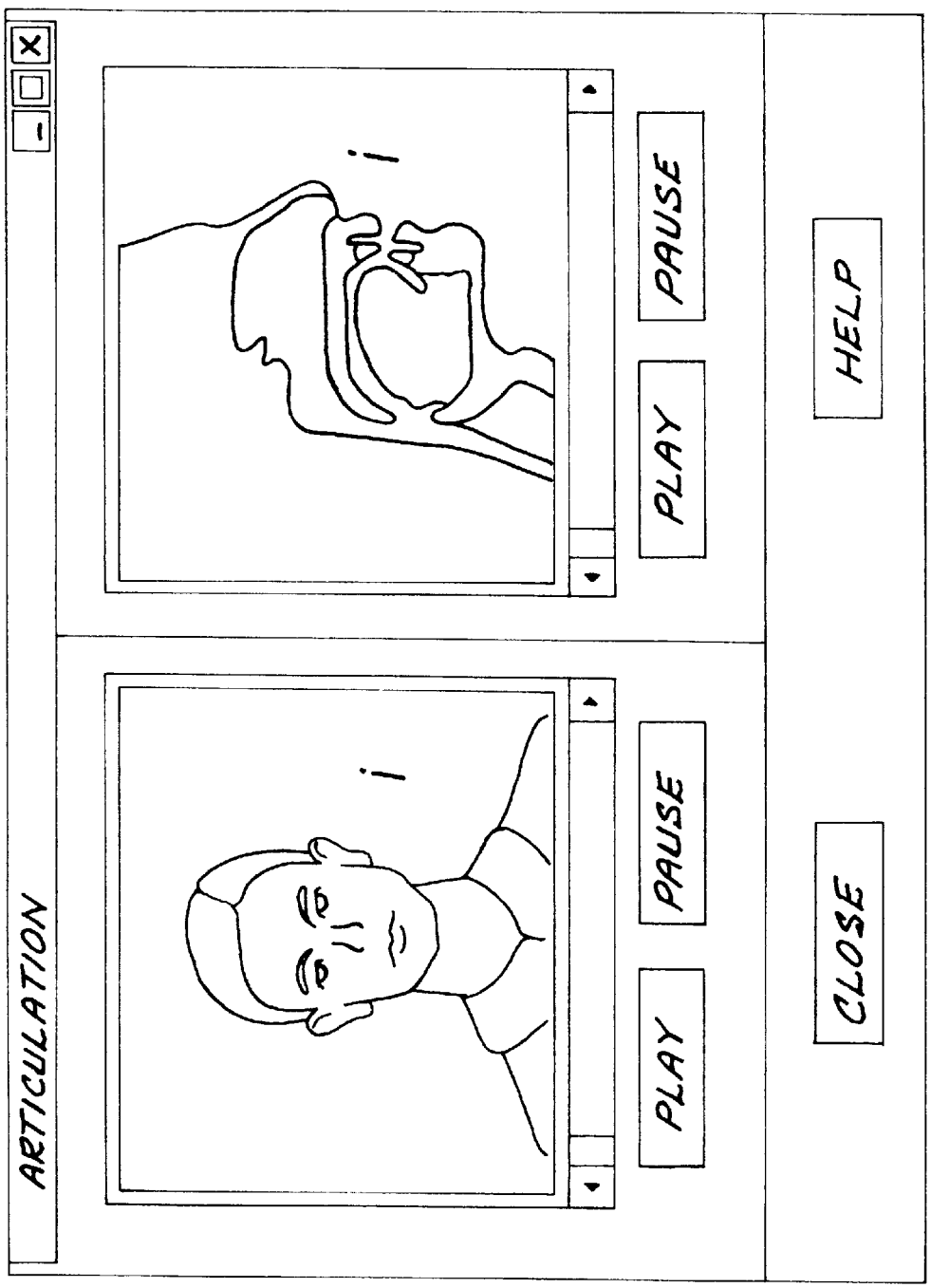
Figure 21A:
Figure 21B:
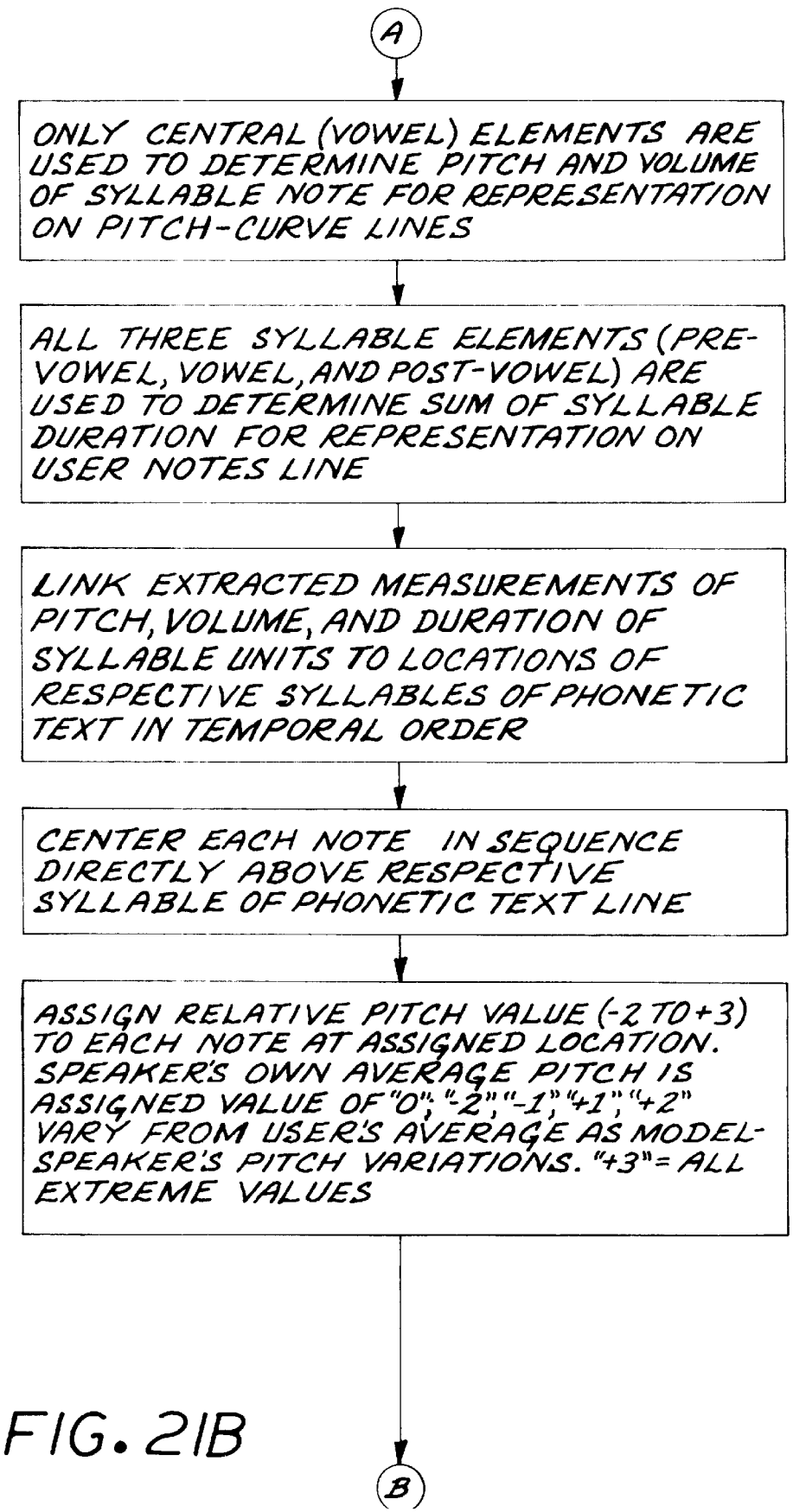
Figure 21E:
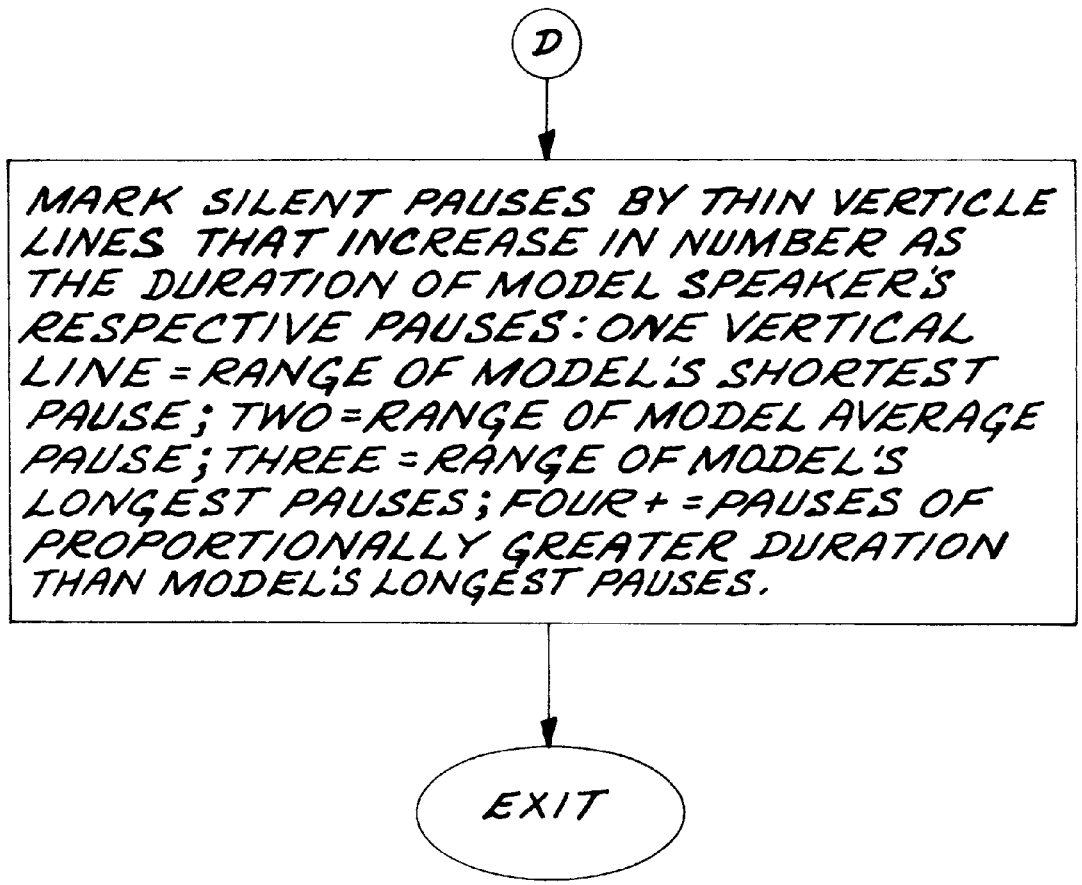
Figure 22A:
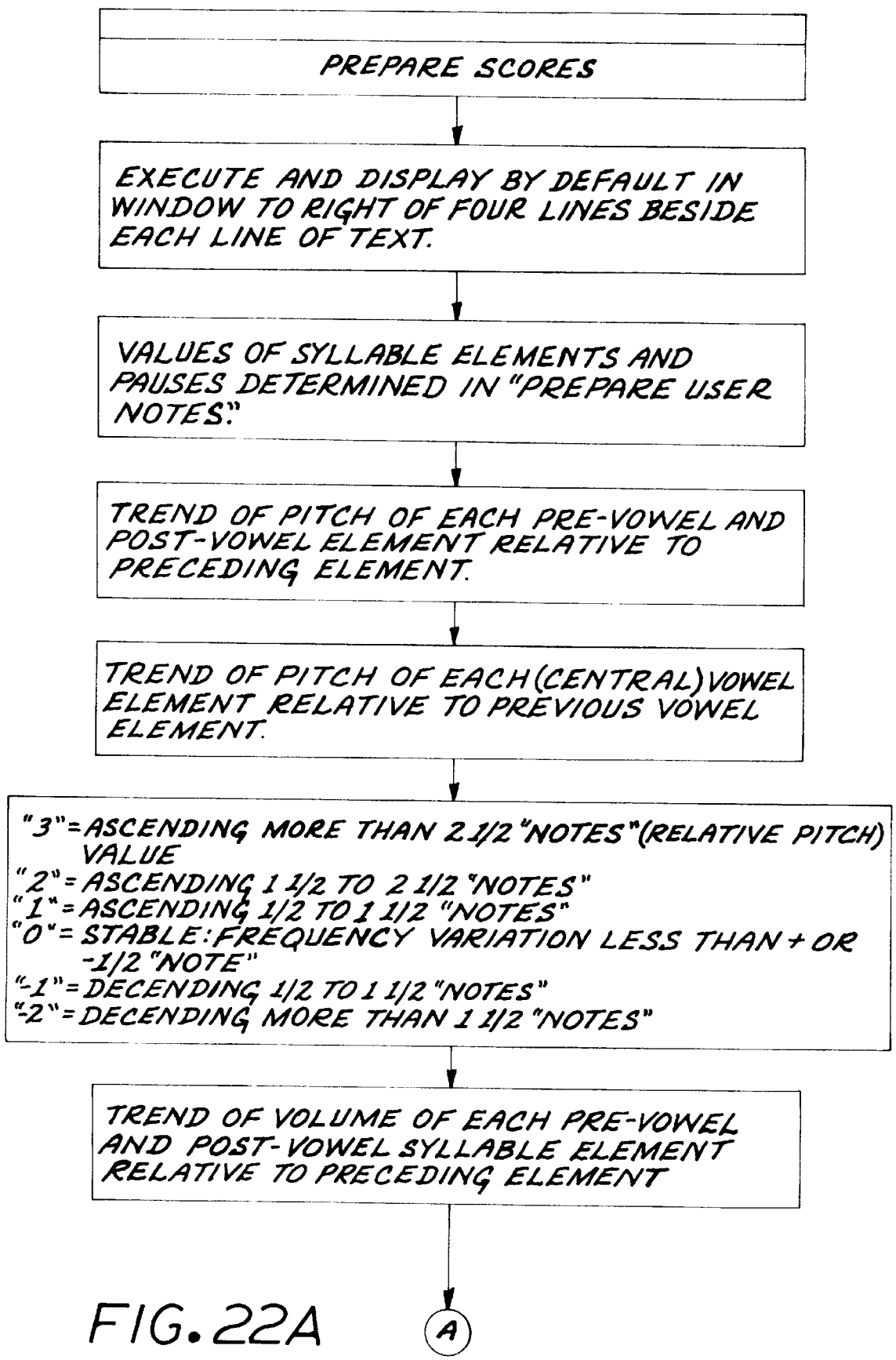
Figure 22B:
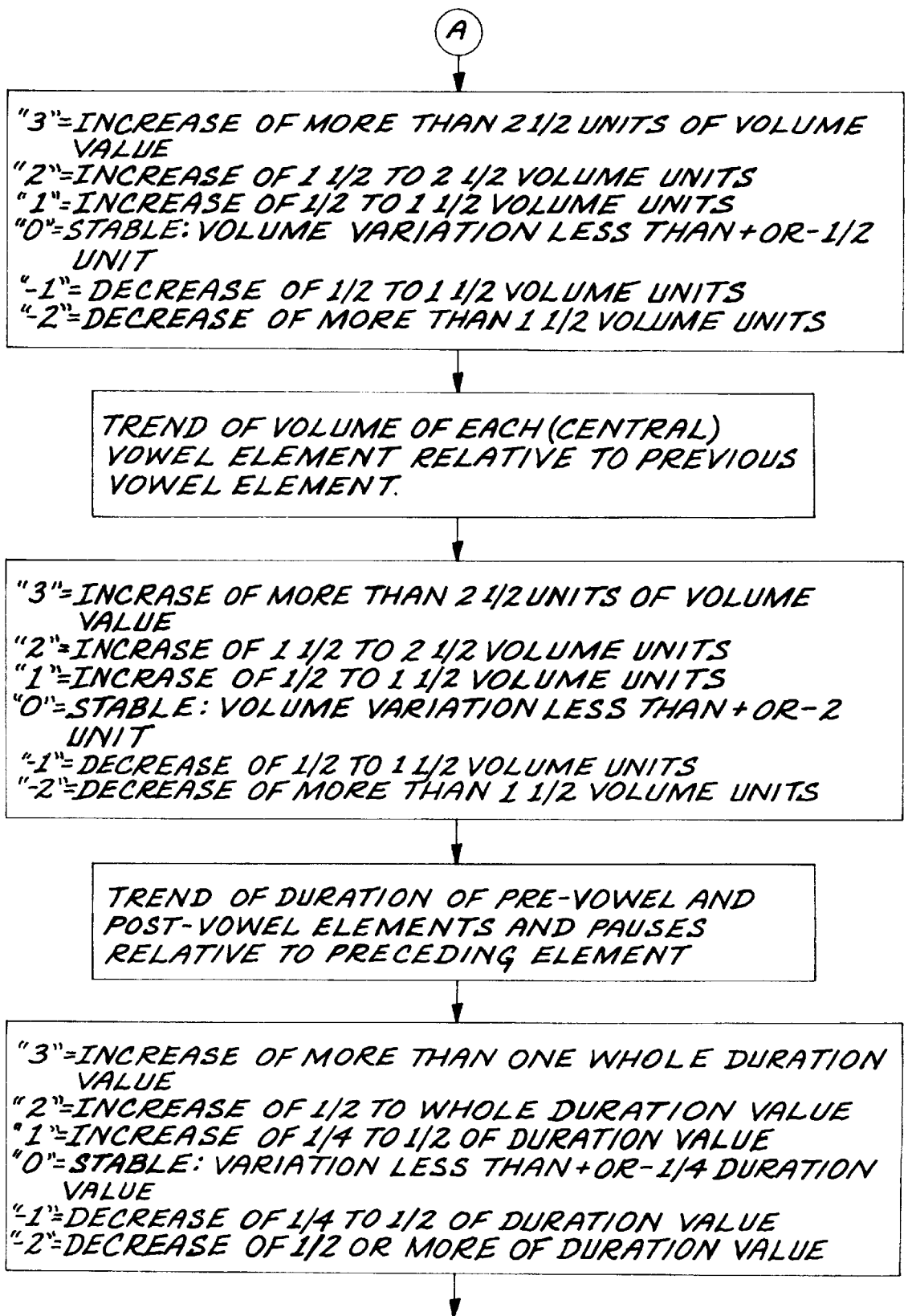
Figure 22C:
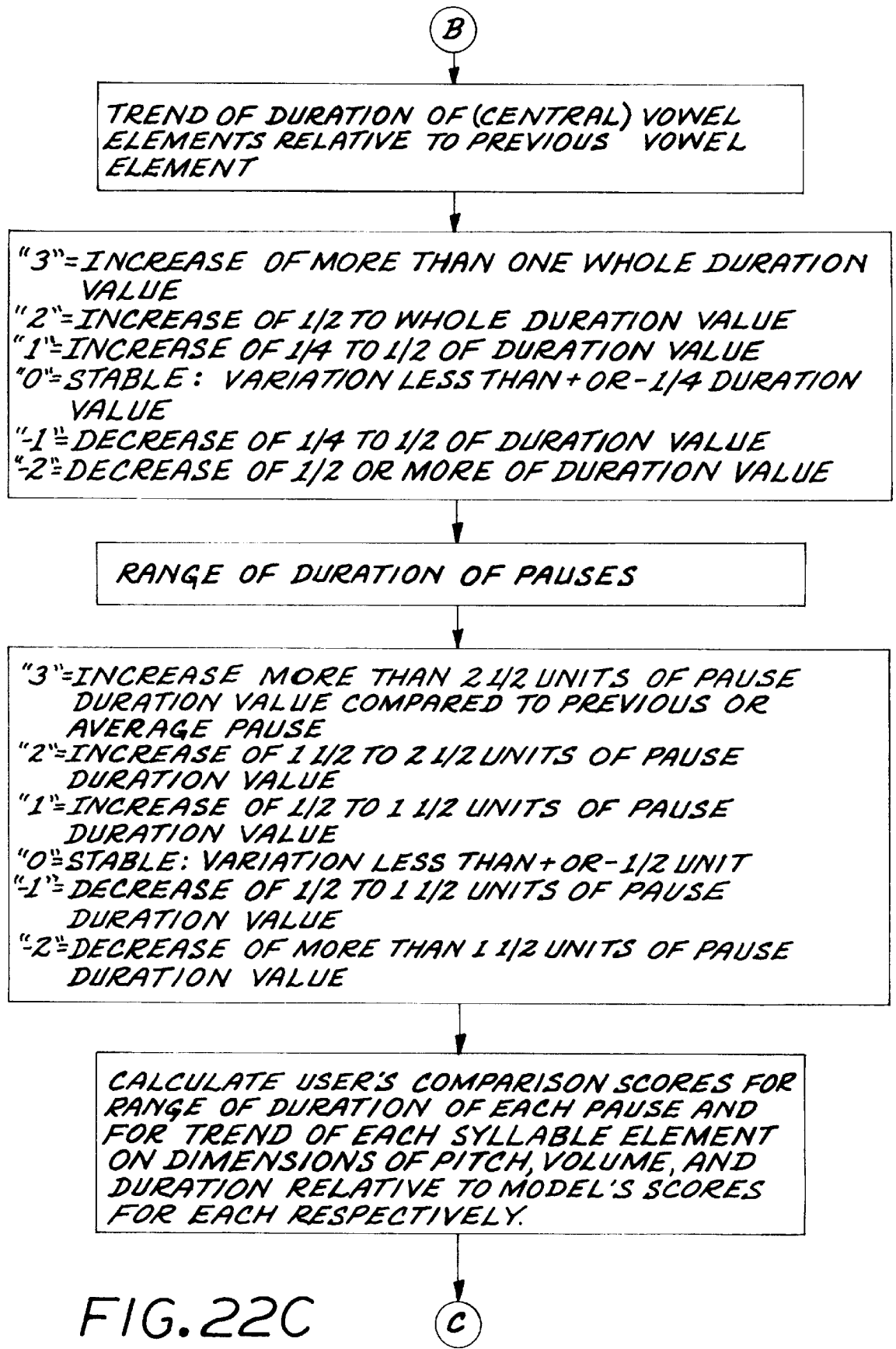
Figure 23:
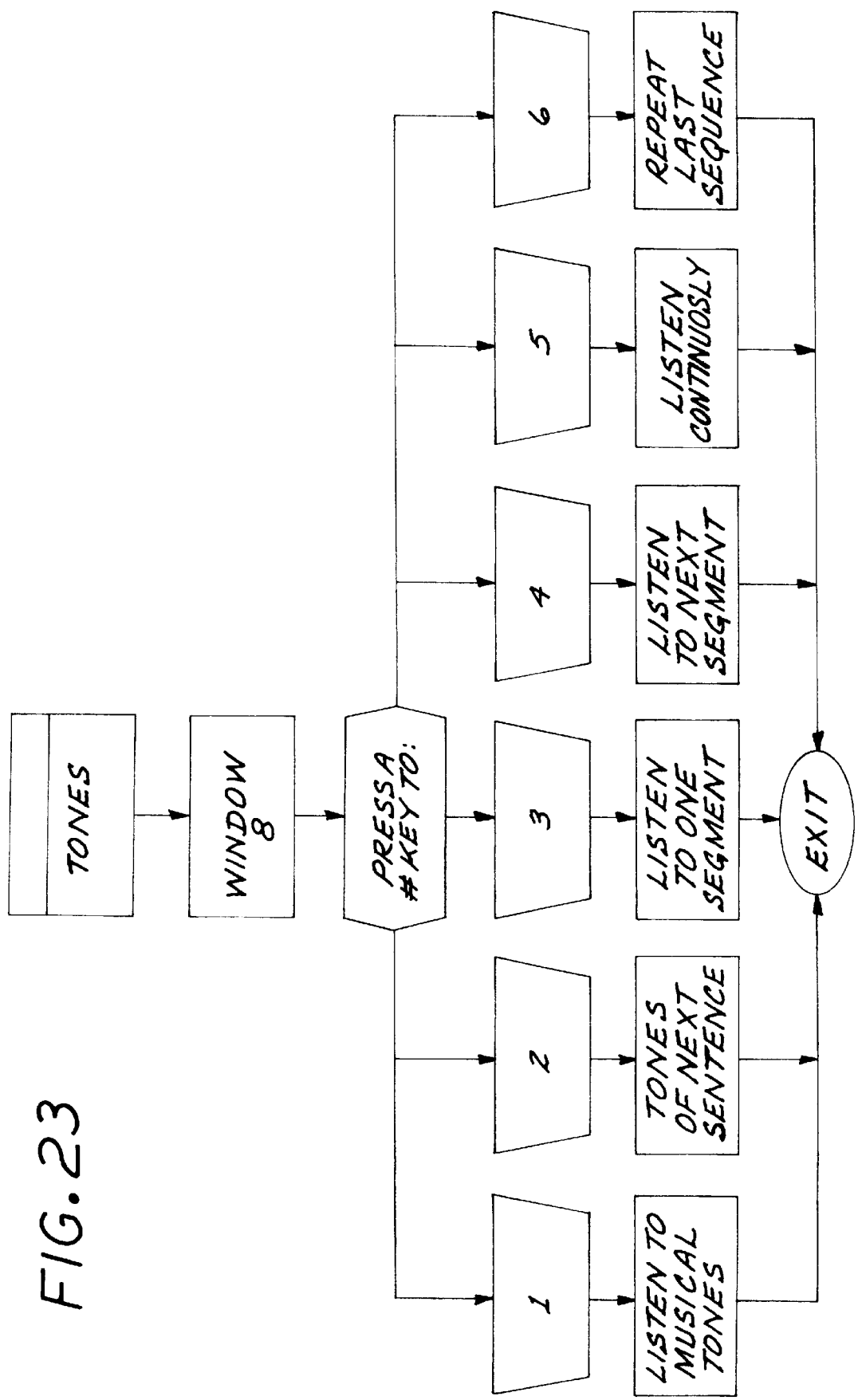
Figure 24:
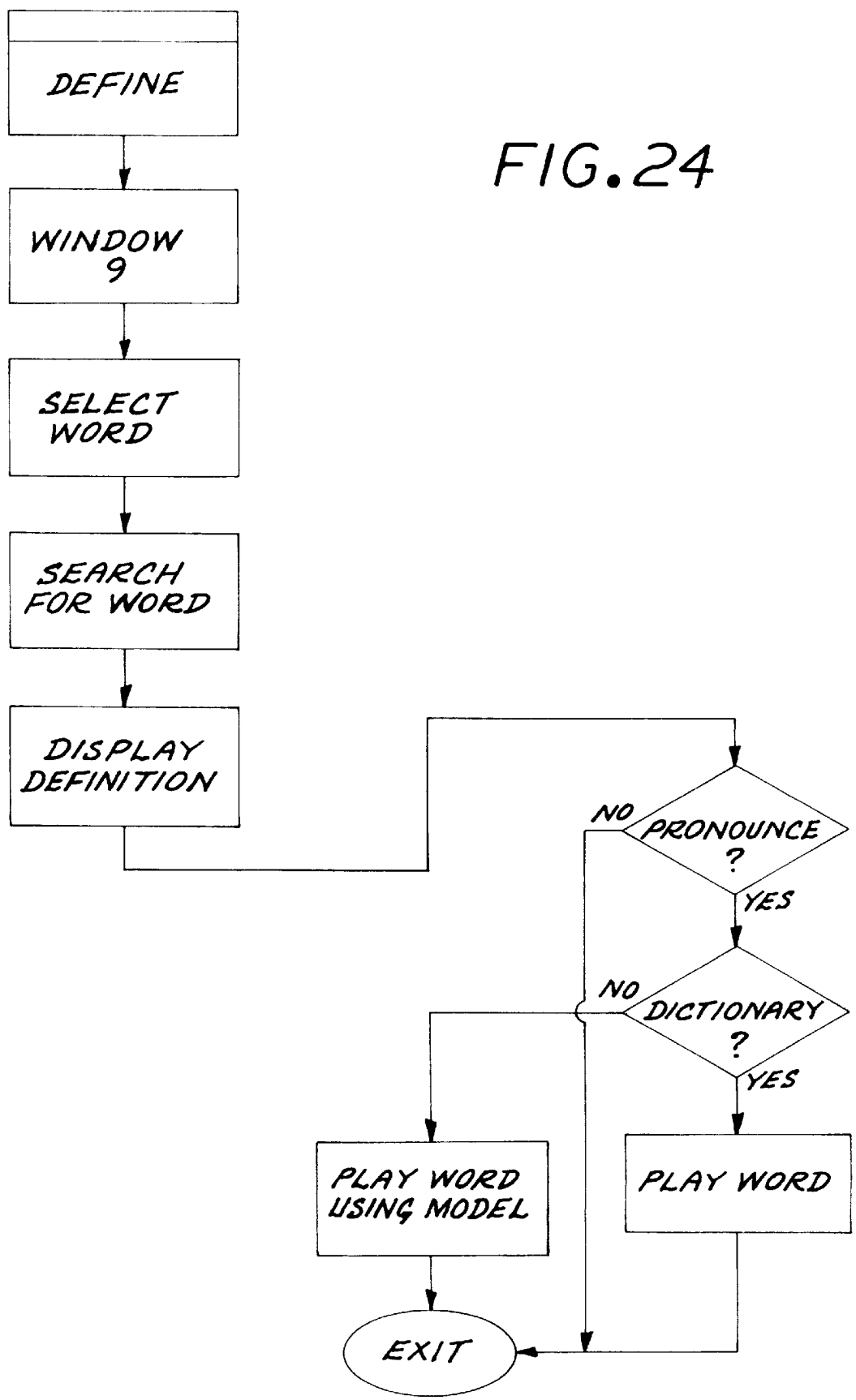
Figure 25:
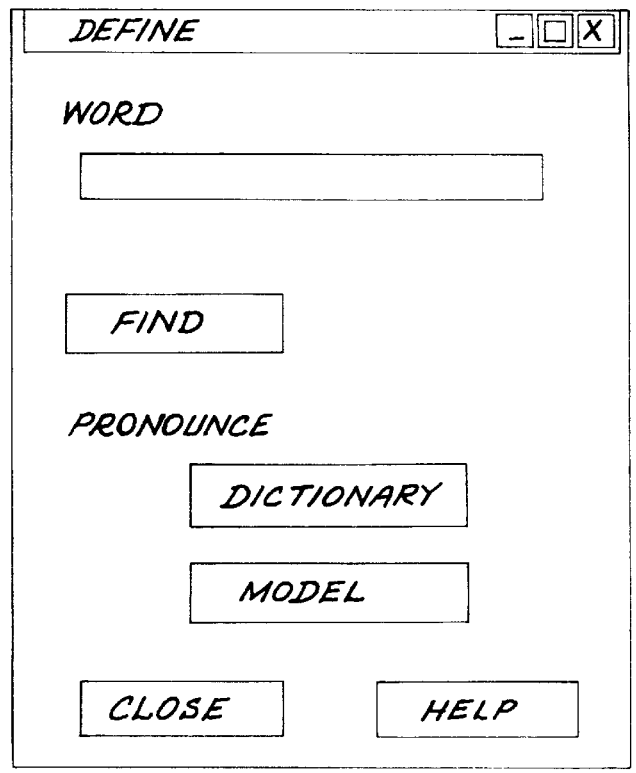
Figure 27:
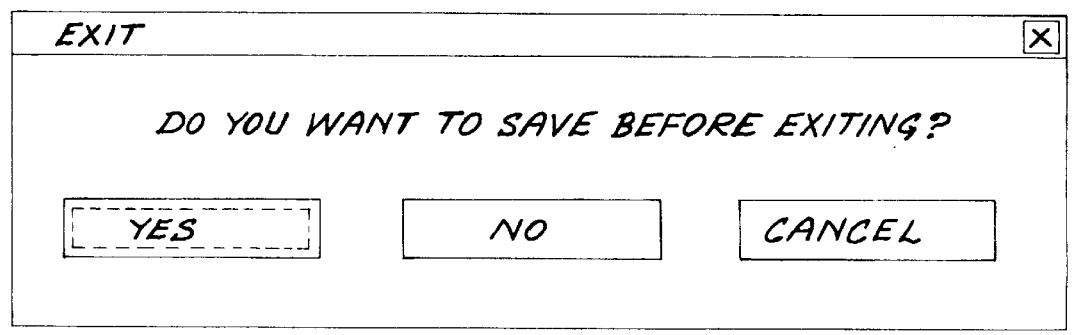
Figure 26:
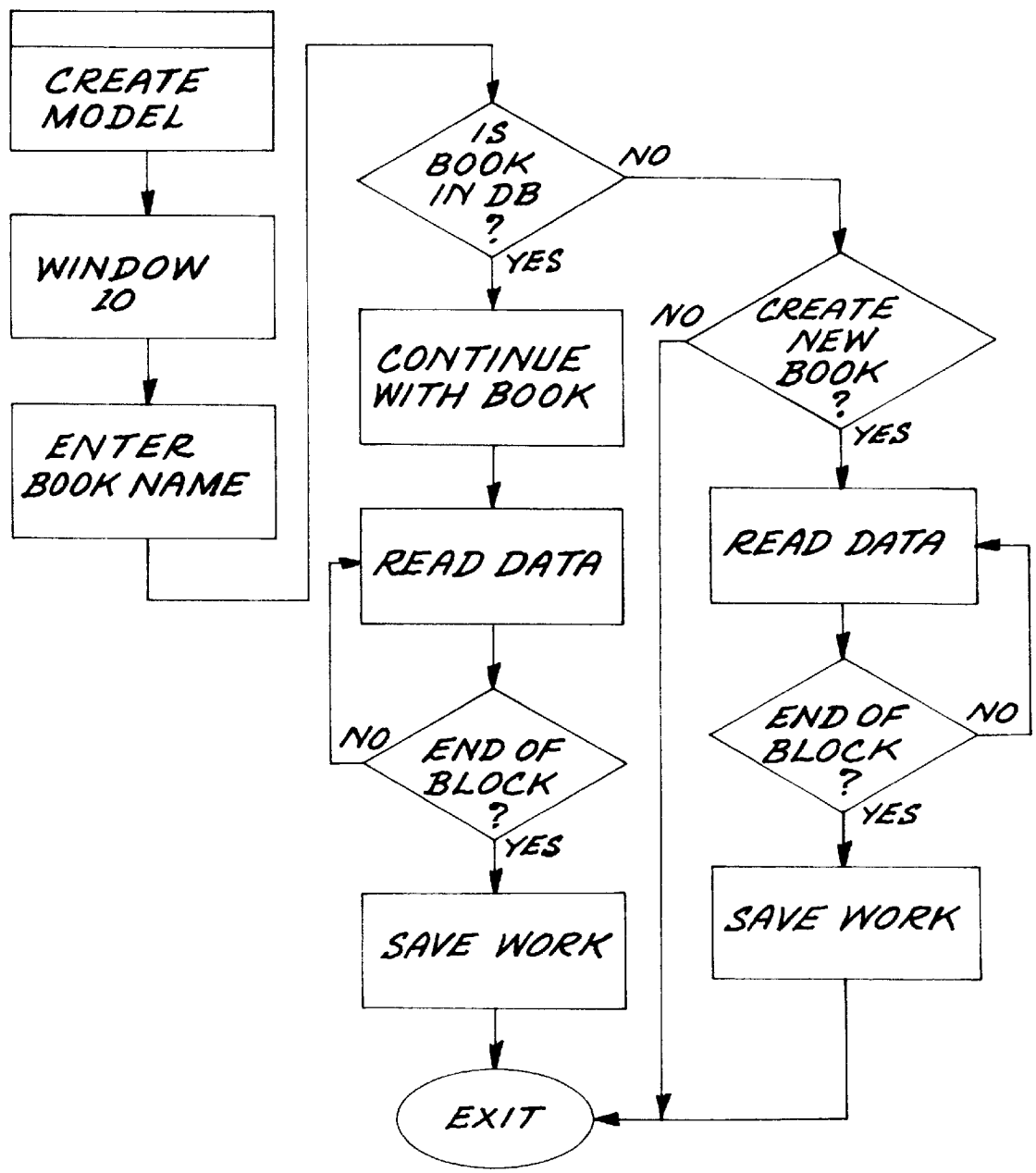

In particular, FIG. 3 is the first WINDOW display (main menu); FIG. 4 is the subroutine for the CHANGE USER; FIG. 5 is the WINDOW display for the change user; FIG. 6 is the WINDOW display for the creation of the new user; FIG. 7 is the FIND routine; FIG. 8 is the WINDOW display for the find function; FIG. 5 is the subroutine for the OPTIONS; FIG. 10 is the WINDOW display for options; FIG. 11 is the DISPLAY TEXT routine; FIG. 12 is the DISPLAY OVERLAY routine; FIG. 13 is the DISPLAY NOTES routine; FIG. 14 is the DISPLAY SCORES routine; FIG. 15 is DISPLAY ARTICULATION routine; FIG. 16 is the LISTEN/SPEAK routine; FIGS. 17–20 are WINDOW displays for display notes, display overlay, listen/speak options and display articulation, respectively; FIGS. 21A–21E are the PREPARER USER NOTES routine; FIGS. 22A–22D are the PREPARE SCORES routine; FIG. 23 is the TONES routine; FIG. 24 is the DEFINE routine; FIG. 35 is the WINDOW display for define; FIG. 26 is the CREATE CUSTOM MODEL routine, and FIG. 27 is the window display for EXIT. It should be noted that pressing the desired buttons/keys F1–F6 shown on the main menu WINDOW display (FIG. 3) initiates the routine corresponding to that key selection.

The present invention thus provides an improved computer assisted phonetic learning system wherein a student/user can easily visually compare the representation of his/her pronunciation of words with that of a model speaker and also be provided with a score illustrating the comparison of, in percentage terms, of the differences. The process of pressing a key (FIGS. 16 and 21) while speaking each accented syllable links and aligns the student's recorded stream of speech to that of a model speaker and to the written text which is read. This alignment greatly facilitates the calculations which are the basis for the feedback on pronunciation provided to the student.

While the invention has been described with reference to its preferred embodiment, it will be understood by those skilled in the art that various changes may be made and equivalents may be substituted for elements thereof without departing from the true spirit and scope of the invention. In addition, many modifications may be made to adapt a particular situation or material to the teaching of the invention without departing from its essential teachings.

What is claimed is:

1. An interactive pronunciation learning system comprising:
    a microprocessor;
    a data input device coupled to said microprocessor to enable a user to interact with said microprocessor;
    a display device coupled to said microprocessor to enable the user to visually compare his/her speech characteristics with that of a model speaker;
    a speech processor for recording and linking the continuous speech of said user reading a body of displayed text, said speech processor being coupled to said microprocessor;
    an audio device coupled to said speech processor for receiving the continuous stream of speech from said model speaker reading the same body of displayed text read by said user;
    means for connecting the output of said speech processor to a hearing device, the user thus being able to both visually and audibly compare his/her speech characteristics to that of the model speaker's; and
    means for mathematically comparing the phonetic and phonemic elements of the acoustic waveforms of the two linked speech segments and displaying the results for each line of text at the user's option, segments of the user's digitally recorded speech being marked and analyzed and compared to each equivalent segment of the model speaker's speech wherein each of said segments comprises one accented syllable and is about three syllables in length.

2. The interactive pronunciation learning system of claim 1 wherein numeric scores are provided rating the correspondence of all the prosodic/phonemic elements on each line, paragraph and/or page.

3. The interactive pronunciation learning system of claim 1 wherein a segment of speech of the model speaker or user is replayed as recorded or optionally as only tones of the detected pitch, volume and duration.

4. The interactive pronunciation learning system of claim 1 wherein the correspondence for each speech segment is based on the dimensions of pitch, volume, duration and phonemic accuracy of the user's speech waveform.

5. A method for implementing an interactive pronunciation learning system comprising the steps of:
    providing a microprocessor to enable a user to interact therewith;
    having the user visually compare his/her speech characteristics with that of a model speaker;
    recording and linking the continuous speech of said user reading a body of displayed text;
    receiving the continuous stream of speech from said model speaker reading the same body of displayed text read by said user;
    visually and audibly comparing the speech characteristics of the user to that of the model speaker's; and
    mathematically comparing the phonetic and phonemic elements of the acoustic waveforms of the two linked speech segments and displaying the results for each line of text at the user's option, segments of the user's digitally recorded speech being marked, analyzed and compared to an equivalent segment of the model speech, wherein each of said segments comprises one accented syllable and is about three syllables in length.

6. The method of claim 5 further including the step of providing numeric scores rating the correspondce of all the prosodic/phonemic elements on each line, paragraph and/or page.

7. The method of claim 5 further including the step of replaying as recorded a segment of speech of the model speaker or user or optionally as only tones of the detected pitch, volume and duration.

8. The method of claim 5 wherein the correspondence for each speech segment is based on the dimensions of pitch, volume, duration and phonemic accuracy of the user's speech waveform.

* * * * *